(12) United States Patent
Lee et al.

(10) Patent No.: US 12,432,742 B2
(45) Date of Patent: Sep. 30, 2025

(54) TERMINAL APPARATUS AND COMMUNICATION METHOD

(71) Applicant: SHARP KABUSHIKI KAISHA, Sakai (JP)

(72) Inventors: Taewoo Lee, Sakai (JP); Wataru Ouchi, Sakai (JP); Toshizo Nogami, Sakai (JP); Shoichi Suzuki, Sakai (JP); Tomoki Yoshimura, Sakai (JP); Huifa Lin, Sakai (JP); Daiichiro Nakashima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 527 days.

(21) Appl. No.: 17/799,127

(22) PCT Filed: Feb. 10, 2021

(86) PCT No.: PCT/JP2021/005031
§ 371 (c)(1),
(2) Date: Aug. 11, 2022

(87) PCT Pub. No.: WO2021/162050
PCT Pub. Date: Aug. 19, 2021

(65) Prior Publication Data
US 2023/0072973 A1    Mar. 9, 2023

(30) Foreign Application Priority Data

Feb. 13, 2020  (JP) ................................. 2020-022477

(51) Int. Cl.
*H04W 72/12*  (2023.01)
*H04L 1/1812*  (2023.01)
(Continued)

(52) U.S. Cl.
CPC .......... *H04W 72/23* (2023.01); *H04L 1/1812* (2013.01); *H04L 1/1887* (2013.01); *H04W 72/21* (2023.01); *H04L 5/0055* (2013.01)

(58) Field of Classification Search
CPC .... H04W 72/23; H04W 72/21; H04L 1/1812; H04L 1/1854; H04L 5/0055
(Continued)

(56) References Cited

U.S. PATENT DOCUMENTS

2013/0170462 A1*  7/2013  Seo ........................ H04L 1/1854
                                                                370/329
2020/0205150 A1*  6/2020  Cheng ................... H04W 72/21
(Continued)

FOREIGN PATENT DOCUMENTS

EP           4057538 A1     9/2022

OTHER PUBLICATIONS

NTT DOCOMO, "New SID Proposal: Study on New Radio Access Technology", RP-160671, 3GPP TSG RAN Meeting #71, Göteborg, Sweden, Mar. 7-10, 2016.
(Continued)

*Primary Examiner* — Jungwon Chang
(74) *Attorney, Agent, or Firm* — ScienBiziP, P.C.

(57) ABSTRACT

A terminal apparatus includes a receiver configured to receive a PDCCH including DCI triggering a Type-3 HARQ-ACK codebook, and a transmitter configured to transmit a PUCCH including the Type-3 HARQ-ACK codebook triggered. A slot in which the PUCCH is transmitted is provided based on K1 obtained based on a PDSCH-to-HARQ_feedback timing indicator field included in the DCI. In a case that the DCI schedules a PDSCH, the PUCCH is transmitted the K1 slots after a slot in which the PDSCH is received. In a case that the DCI does not schedule a PDSCH,
(Continued)

the PDCCH is transmitted in a slot after slots corresponding to the K1 from a slot in which the PDCCH is received.

9 Claims, 8 Drawing Sheets

(51) Int. Cl.
*H04L 1/1867* (2023.01)
*H04W 72/21* (2023.01)
*H04W 72/23* (2023.01)
*H04L 5/00* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 2021/0344451 | A1* | 11/2021 | Hedayat | H04W 74/0816 |
| 2022/0110150 | A1* | 4/2022 | Lin | H04L 1/1812 |
| 2022/0271870 | A1* | 8/2022 | Wu | H04L 1/1854 |
| 2022/0353853 | A1* | 11/2022 | Wu | H04W 72/23 |

OTHER PUBLICATIONS

Qualcomm Inc., "New WID on NR-based Access to Unlicensed Spectrum", RP-182878, 3GPP TSG RAN Meeting #82, Sorrento, Italy, Dec. 10-13, 2018.

"3rd Generation Partnership Project; Technical Specification Group Radio Access Network; NR; Physical channels and modulation(Release 16)", 3GPP TS 38.211 V16.0.0 (Dec. 2019).

"3rd Generation Partnership Project; Technical Specification Group Radio Access Network; NR; Multiplexing and channel coding(Release 16)", 3GPP TS 38.212 V16.0.0 (Dec. 2019).

"3rd Generation Partnership Project; Technical Specification Group Radio Access Network; NR; Physical layer procedures for control(Release 16)", 3GPP TS 38.213 V16.0.0 (Dec. 2019).

"3rd Generation Partnership Project; Technical Specification Group Radio Access Network; NR; Physical layer procedures for data(Release 16)", 3GPP TS 38.214 V16.0.0 (Dec. 2019).

Huawei, "Feature lead summary#3 of HARQ enhancements for NR-U", R1-1909806, 3GPP TSG RAN WG1 Meeting #98, Prague, Czech Republic, Aug. 28-30, 2019.

Sharp, "Remaining issues and corrections on HARQ enhancement for NR-U", R1-2000874, 3GPP TSG RAN WG1 #100, e-Meeting, Feb. 24-Mar. 6, 2020.

* cited by examiner

Figure A: Table of number of OFDM symbols per slot $N_{symb}^{slot,\mu}$ for subcarrier spacing configuration $\mu$ and normal cyclic prefix

| $\mu$ | slot_configuration | | | | | |
|---|---|---|---|---|---|---|
| | 0 | | | 1 | | |
| | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N_{symb}^{slot,\mu}$ for subcarrier spacing configuration $\mu$ and extended cyclic prefix

| $\mu$ | slot_configuration | | | | | |
|---|---|---|---|---|---|---|
| | 0 | | | 1 | | |
| | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 2 | 12 | 40 | 4 | 6 | 80 | 8 |

FIG. 2

TERMINAL APPARATUS AND COMMUNICATION METHOD

TECHNICAL FIELD

The present invention relates to a terminal apparatus and a communication method.

This application claims priority based on JP 2020-22477 filed on Feb. 13, 2020, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as User Equipment (UE). LTE is a cellular communication system in which multiple areas covered by base station apparatuses are deployed in a cell structure. A single base station apparatus may manage multiple serving cells.

3GPP has been studying a next generation standard (New Radio or NR) (NPL 1) to make a proposal for international Mobile Telecommunication (IMT)-2020, a standard for a next generation mobile communication system developed by the International Telecommunication Union (ITU). NR is required to satisfy requirements for three scenarios including enhanced Mobile Broadland (eMBB), massive Machine Type Communication (mMTC), and Ultra Reliable and Low Latency Communication (URLLC) in a single technology framework.

In addition, application of NR to an unlicensed spectrum has been under study (NPL 2). Studies have been conducted about application, to a carrier in an unlicensed frequency band, NR supporting a wide band of 100 MHz, achieving a data rate of several Gbps.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.
NPL 2: "New WID on NR-based Access to Unlicensed Spectrum", RP-182878, Qualcomm Incorporated, 3GPP TSG RAN Meeting #82, Sorrento, Italy, 10-13 Dec. 2018.
NPL 3: "3GPP TS 38.211 V16.0.0 (2019-12), NR; Physical channels and modulation".
NPL 4: "3GPP TS 38.212 V16.0.0 (2019-12), NR; Multiplexing and channel coding".
NPL 5: "3GPP TS 38.213 V16.0.0 (2019-12), NR; Physical layer procedures for control".
NPL 6: "3GPP TS 38.214 V16.0.0 (2019-12), NR; Physical layer procedures for data".

SUMMARY OF INVENTION

Technical Problem

One aspect of the present invention provides a terminal apparatus that can efficiently perform reception of uplink transmission and/or downlink transmission, a communication method used for the terminal apparatus, a base station apparatus that can efficiently perform reception of downlink transmission and/or uplink transmission, and a communication method used for the base station apparatus.

Solution to Problem (1) A first aspect of the present invention is a terminal apparatus including a receiver configured to receive a PDCCH including DCI triggering a Type-3 HARQ-ACK codebook, and a transmitter configured to transmit a PUCCH including the Type-3 HARQ-ACK codebook triggered, wherein a slot in which the PUCCH is transmitted is provided based on K1 obtained based on a PDSCH-to-HARQ_feedback timing indicator field included in the DCI, and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot in which the PDCCH is received.

(2) A second aspect of the present invention is a terminal apparatus including a receiver configured to receive a PUCCH including DCI triggering a Type-3 HARQ-ACK codebook, and a transmitter configured to transmit a PUCCH including the Type-3 HARQ-ACK codebook triggered, wherein a slot in which the PUCCH is transmitted is provided based on K1 obtained based on a PDSCH-to-HARQ_feedback timing indicator field included in the DCI, and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot indicated by a value in a TDRA field included in the DCI.

(3) A third aspect of the present invention is a base station apparatus including a transmitter configured to transmit a PDCCH including DCI triggering a Type-3 HARQ-ACK codebook, and a receiver configured to receive a PUCCH including the Type-3 HARQ-ACK codebook triggered, wherein a slot in which the PUCCH is received is provided based on K1 obtained based on a PDSCH-to-HARQ_feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot in which the PDCCH is transmitted.

(4) A fourth aspect of the present invention is a base station apparatus including a transmitter configured to transmit a PDCCH including DCI triggering a Type-3 HARQ-ACK codebook, and a receiver configured to receive a PUCCH including the Type-3 HARQ-ACK codebook triggered, wherein a slot in which the PUCCH is received is provided based on K1 obtained based on a PDSCH-to-HARQ_feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot indicated by a value in a TDRA field included in the DCI.

(5) A fifth aspect of the present invention is a communication method used for a terminal apparatus, the communication method used in the terminal apparatus, the communication method including the steps of receiving a PDCCH including DCI triggering a Type-3 HARQ-ACK codebook, and transmitting a PUCCH including the Type-3 HARQ- ACK codebook triggered, wherein a slot in which the PUCCH is transmitted is provided based on K1 obtained based on a PDSCH-to-HARQ_feedback timing indicator field included in the DCI, and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot in which the PDCCH is received.

(6) A sixth aspect of the present invention is a communication method used for a terminal apparatus, the communication method used in the terminal apparatus, the communication method including the steps of receiving a PDCCH including DCI triggering a Type-3 HARQ-ACK codebook, and transmitting a PUCCH including the Type-3 HARQ-ACK codebook triggered, wherein a slot in which the PUCCH is transmitted is provided based on K1 obtained based on a PDSCH-to-HARQ_feedback timing indicator field included in the DCI, and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot indicated by a value in a TDRA field included in the DCI.

(7) A seventh aspect of the present invention is a communication method used for a base station apparatus, the communication method used in the base station apparatus, a communication method including the steps of transmitting a PDCCH including DCI triggering a Type-3 HARQ-ACK codebook, and receiving a PUCCH including the Type-3 HARQ-ACK codebook triggered, wherein a slot in which the PUCCH is received is provided based on K1 obtained based on a PDSCH-to-HARQ_feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot in which the PDCCH is transmitted.

(8) An eighth aspect of the present invention is a communication method used for a base station apparatus, the communication method used in the base station apparatus, the communication method including the steps of transmitting a PDCCH including DCI triggering a Type-3 HARQ-ACK codebook, and receiving a PUCCH including the Type-3 HARQ-ACK codebook triggered, wherein a slot in which the PUCCH is received is provided based on K1 obtained based on a PDSCH-to-HARQ_feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot indicated by a value in a TDRA field included in the DCI.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship among $N^{slot}_{symb}$, a subcarrier spacing configuration µ, a slot configuration, and a CP configuration according to an aspect of the present embodiment.

An embodiment of the present invention will be described below.

"A and/or B" may be a term including "A" "B", or "A and B".

The fact that a parameter or information indicates one or multiple values may mean that the parameter or the information includes at least a parameter or information indicating the one or the multiple values. A higher layer parameter may be a single higher layer parameter. The higher layer parameter may be an Information Element (IE) including multiple parameters.

Figure 1:
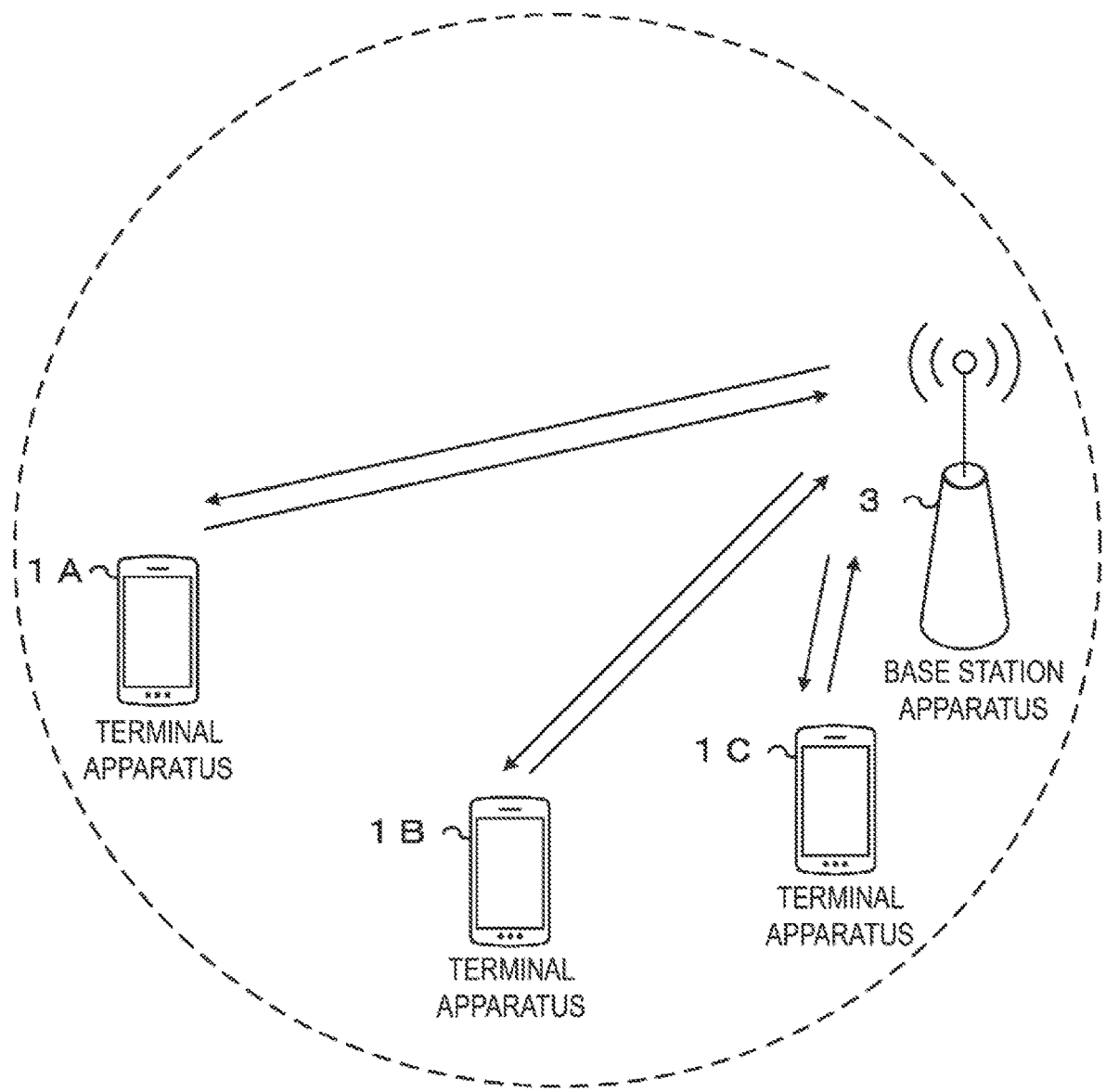
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3 (gNB). Hereinafter, each of the terminal apparatuses 1A to 1C is also referred to as a terminal apparatus 1 (UE).

The base station apparatus 3 may include one of or both a Master Cell Group (MCG) and a Secondary Cell Group (SCG). The MCG is a group of serving cells at least including a Primary Cell (PCell). The SCG is a group of serving cells including at least a Primary Secondary Cell (PSCell). The PCell may be a serving cell that is given based on initial connection. The MCG may include one or multiple Secondary Cells (SCells). The SCG may include one or multiple SCells. A serving cell identity is a short identity for identifying the serving cell. The serving cell identity may be provided by a higher layer parameter.

In the following, frame configuration will be described.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol may be converted into a time-continuous signal in baseband signal generation.

A SubCarrier Spacing (SCS) may be provided by a subcarrier spacing $\Delta f = 2^\mu \cdot 15$ kHz. For example, a subcarrier spacing configuration µ may be configured to be any of 0, 1, 2, 3, 4, and/or 5. For a certain BandWidth Part (BWP), the subcarrier spacing configuration µ may be provided by a higher layer parameter.

In the radio communication system according to an aspect of the present embodiment, a time unit $T_c$ is used for representing a length of the time domain. The time unit $T_c$ may be given by $T_c=1/(\Delta f_{max} \cdot N_f)$. $\Delta f_{max}$ may be the maximum value of the subcarrier spacing supported by the radio communication system according to an aspect of the present embodiment. $\Delta f_{max}$ may be $\Delta f_{max}=480$ kHz. $N_f$ may be $N_f=4096$. A constant κ is $\kappa=\Delta f_{max} \cdot N_f/(\Delta f_{ref} N_{f.\ ref})=64$. $\Delta f_{ref}$ may be 15 kHz. $N_{f.\ ref}$ may be 2048.

The constant κ may be a value indicating a relationship between a reference subcarrier spacing and $T_c$. The constant κ may be used for the length of a subframe. Based at least on the constant κ, the number of slots included in the subframe may be given. $\Delta f_{ref}$ is the reference subcarrier spacing and $N_{f,\ ref}$ is a value corresponding to the reference subcarrier spacing.

Downlink transmission and/or uplink transmission includes frames of 10 ms. The frame includes 10 subframes. The length of the subframe is 1 ms. The length of the frame may be provided regardless of the subcarrier spacing $\Delta f$. In other words, the frame configuration may be provided regardless of μ. The length of the subframe may be provided regardless of the subcarrier spacing $\Delta f$. In other words, the configuration of the subframe may be provided regardless of μ.

For a certain subcarrier spacing configuration μ, the number and indexes of slots included in a subframe may be provided. For example, a first slot number $n^\mu_s$ may be provided in ascending order ranging from 0 to $N^{subframe,\ \mu}_{slot}-1$ within a subframe. For the subcarrier spacing configuration μ, the number and indexes of slots included in a frame may be provided. For example, a second slot number $n^\mu_{s,\ f}$ may be provided in ascending order ranging from 0 to $N^{frame,\ \mu}_{slot}-1$ within a frame. $N^{slot}_{symb}$ continuous OFDM symbols may be included in one slot. $N^{slot}_{symb}$ may be provided based at least on a part or an entirety of a slot configuration and/or a Cyclic Prefix (CP) configuration. The slot configuration may be provided at least by a higher layer parameter tdd-UL-DL-Configuration-Common. The CP configuration may be provided based at least on a higher layer parameter. The CP configuration may be given based at least on dedicated RRC signalling. Each of the first slot number and the second slot number is also referred to as slot number (slot index).

FIG. 2 is an example illustrating a relationship among $N^{slot}_{symb}$, a subcarrier spacing configuration μ, a slot configuration, and a CP configuration according to an aspect of the present embodiment. In FIG. 2A, in a case that the slot configuration is zero, the subcarrier spacing configuration μ is two and the CP configuration is a normal cyclic prefix (normal CP), $N^{slot}_{symb}=14$, $N^{frame,\ \mu}_{slot}=40$, and $N^{subframe,\ \mu}_{slot}=4$. In FIG. 2B, in a case that the slot configuration is zero, the subcarrier spacing configuration μ is two and the CP configuration is an extended cyclic prefix (extended CP), $N^{slot}_{symb}=12$, $N^{frame,\ \mu}_{slot}=40$, and $N^{subframe,\ \mu}_{slot}=4$. The value of $N^{slot}_{symb}$ in the slot configuration 0 may correspond to twice the value of $N^{slot}_{symb}$ in the slot configuration 1.

Physical resources will be described below.

An antenna port is defined in a manner in which a channel through which a symbol is transmitted in one antenna port can be estimated from a channel through which another symbol is transmitted in the same antenna port. In a case that a large scale property of a channel through which a symbol is transmitted at one antenna port can be estimated from a channel through which a symbol is transmitted at another antenna port, the two antenna ports are referred to as Quasi Co-Located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

For each set of a subcarrier spacing configuration and a carrier, a resource grid including $N^\mu_{RB,\ x} N^{RB}_{sc}$ subcarriers and $N^{(\mu)}_{symb} N^{subframe,\ \mu}_{symb}$ OFDM symbols is provided. $N^\mu_{RB,\ x}$ may indicate the number of resource blocks provided for the subcarrier spacing configuration μ for a carrier X. $N^\mu_{RB,\ x}$ may indicate the maximum number of resource blocks provided for the subcarrier spacing configuration μ for the carrier x. The carrier x indicates either a downlink carrier or an uplink carrier. In other words, x is "DL" or "UL". $N^\mu_{RB}$ is a name including $N^\mu_{RB,\ DL}$ and/or $N^\mu_{RB,\ UL}$. $N^{RB}_{sc}$ may indicate the number of subcarriers included in one resource block. At least one resource grid may be provided for each antenna port p and/or for each subcarrier spacing configuration μ and/or for each Transmission direction configuration. The transmission direction at least includes a Downlink (DL) and an Uplink (UL). Hereinafter, a set of parameters including at least some or all of the antenna port p, the subcarrier spacing configuration μ, and the transmission direction configuration is also referred to as a first radio parameter set. In other words, one resource grid may be provided for each first radio parameter set.

In the downlink, a carrier included in a serving cell is referred to as a downlink carrier (or a downlink component carrier). In the uplink, a carrier included in a serving cell is referred to as an uplink carrier (uplink component carrier). A downlink component carrier and an uplink component carrier are collectively referred to as a component carrier (or a carrier).

Each element in the resource grid provided for each first radio parameter set is referred to as a resource element. The resource element is identified by an index $k_{sc}$ in the frequency domain and an index $l_{sym}$ in the time domain. For a certain first radio parameter set, the resource element is identified by the index $k_{sc}$ in the frequency domain and the index $l_{sym}$ in the time domain. The resource element to be identified by the index $k_{sc}$ of the frequency domain and the index $l_{sym}$ of the time domain is also referred to as a resource element ($k_{sc}$, $l_{sym}$). The index $k_{sc}$ of the frequency domain indicates any value from 0 to $N^\mu_{RB} N^{RB}_{sc}-1$. $N^\mu_{RB}$ may be the number of resource blocks provided for the subcarrier spacing configuration μ. $N^{RB}_{sc}$ is the number of subcarriers included in the resource block and $N^{RB}_{sc}=12$. The index $k_{sc}$ in the frequency domain may correspond to the subcarrier index $k_{sc}$. The index $l_{sym}$ in the time domain may correspond to the OFDM symbol index $l_{sym}$.

Figure 3:
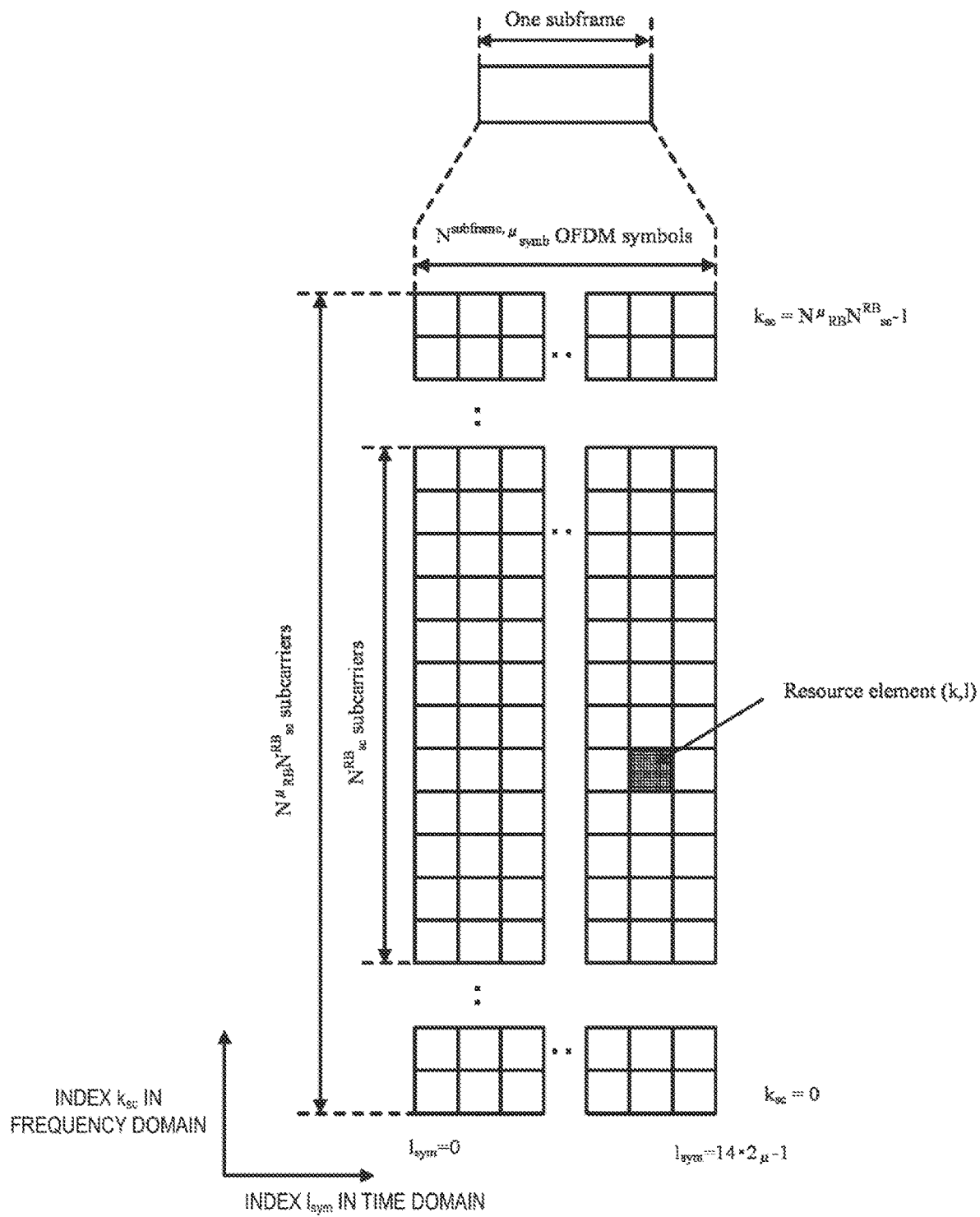
FIG. 3 is a schematic diagram illustrating an example of a resource grid in a subframe according to an aspect of the present embodiment.

FIG. 3 is a schematic diagram illustrating an example of the resource grid in the subframe according to an aspect of the present embodiment. In the resource grid of FIG. 3, the horizontal axis is the index $l_{sym}$ in the time domain and the vertical axis is the index $k_{sc}$ in the frequency domain. In one subframe, the frequency domain of the resource grid includes $N^{\mu}_{RB}N^{RB}_{sc}$ subcarriers. In one subframe, the time domain of the resource grid may include $14 \cdot 2^{\mu}$ OFDM symbols. One resource block includes $N^{RB}_{sc}$ subcarriers. The time domain of the resource block may correspond to 1 OFDM symbol. The time domain of the resource block may correspond to 14 OFDM symbols. The time domain of the resource block may correspond to one or multiple slots. The time domain of the resource block may correspond to one subframe.

For the terminal apparatus 1, performing transmission and/or reception by using only a subset of resource grids may be indicated. The subset of resource grids is also referred to as a BWP and the BWP may be provided based at least on a part or an entirety of the higher layer parameter and/or DCI. The BWP is also referred to as a bandwidth part (BP). In other words, the terminal apparatus 1 may not receive an indication of transmission and/or reception using all sets of resource grids. In other words, the terminal apparatus 1 may receive an indication of transmission and/or reception using some frequency resources within the resource grid. One BWP may include multiple resource blocks in the frequency domain. One BWP may include multiple contiguous resource blocks in the frequency domain. A BWP configured for a downlink carrier is also referred to as a downlink BWP. A BWP configured for an uplink carrier is also referred to as an uplink BWP.

One or multiple downlink MVPs may be configured for the terminal apparatus 1. The terminal apparatus 1 may attempt to receive a physical channel (for example, a PDCCH, a PDSCH, and/or an SS/PBCH) in one downlink BWP out of the one or multiple downlink BWPs. The one downlink BWP is also referred to as an active downlink BWP.

One or multiple uplink BWPs may be configured for the terminal apparatus 1. The terminal apparatus 1 may attempt to transmit a physical channel (for example, a PUCCH, a PUSCH, and/or a PRACH) in one uplink BWP out of the one or multiple uplink BWPs. The one uplink BWP is also referred to as an active uplink BWP.

A set of downlink BWPs may be configured for each serving cell. The set of downlink BWPs may include one or multiple downlink BWPs. A set of uplink BWPs may be configured for each serving cell. The set of uplink BWPs may include one or multiple uplink BWPs.

A higher layer parameter is a parameter included in a higher layer signaling. The higher layer signaling may be a Radio Resource Control (RRC) signaling, or may be a Medium Access Control Control Element (MAC CE). Here, the higher layer signaling may be a signal of an RRC layer, or may be a signal of an MAC layer.

The higher layer signaling may be common RRC signalling. The common RRC signalling may at least include a part or all of the following feature C1 to feature C3: feature C1) the common RRC signalling is mapped to a BCCH logical channel or a CCCH logical channel;
  feature C2) the common RRC signalling includes at least
     a radioResourceConfigCommon information element;
  feature C3) the common RRC signalling is mapped to a
     PBCH.

The radioResourceConfigCommon information element may include information indicating a configuration commonly used in a serving cell. The configuration used in a serving cell in common may at least include configuration of the PRACH. The configuration of the PRACH may at least indicate one or multiple random access preamble indexes.

The configuration of the PRACH may at least indicate time/frequency resources of the PRACH.

The higher layer signaling may be dedicated RRC signalling. The dedicated RRC signalling may at least include a part or all of the following features D1 to D2: feature D1) the dedicated RRC signalling is mapped to a DCCH logical channel;
  feature D2) the dedicated RRC signalling includes at least
     a radioResourceConfigDedicated information element.

The radioResourceConfigDedicated information element may include at least information indicating a configuration specific to the terminal apparatus 1. The radioResourceConfigDedicated information element may include at least information indicating a BWP configuration. The BWP configuration may indicate at least a frequency resource of the BWP.

For example, a MIB, first system information, and second system information may be included in the common RRC signalling. In addition, a higher layer message that is mapped to the DCCH logical channel and includes at least radioResourceConfigCommon may be included in the common RRC signalling. In addition, a higher layer message that is mapped to the DCCH logical channel and does not include the radioResourceConfigCommon information element may be included in the dedicated RRC signalling. In addition, a higher layer message that is mapped to the DCCH logical channel and includes at least the radioResourceConfigDedicated information element may be included in the dedicated RRC signalling.

The first system information may indicate at least a time index of a Synchronization Signal (SS) block. The SS block is also referred to as an SS/PBCH block. The SS/PBCH block is also referred to as an SS/PBCH. The first system information may include at least information related to a PRACH resource. The first system information may include at least information related to a configuration of initial connection. The second system information may be system information other than the first system information.

The radioResourceConfigDedicated information element may include at least information related to a PRACH resource. The radioResourceConfigDedicated information element may include at least information related to the configuration of initial connection.

In the following, physical channels and physical signals according to various aspects of the present embodiment will be described.

The uplink physical channel may correspond to a set of resource elements for carrying information that is generated in a higher layer. The uplink physical channel is a physical channel that is used in the uplink carrier. In the radio communication system according to an aspect of the present embodiment, at least a part or all of the following uplink physical channels are used.
  Physical Uplink Control CHannel (PUCCH)
  Physical Uplink Shared CHannel (PUSCH)
  Physical Random Access CHannel (PRACH)

The PUCCH may be used to transmit Uplink Control Information (UCI). The uplink control information includes some or all of Channel State Information (CSI), a Scheduling Request (SR), and a Hybrid Automatic Repeat request ACKnowledgement (HARQ-ACK) corresponding to a transport block (TB, a Medium Access Control Protocol Data Unit (MAC PDU), Downlink-Shared Channel (DL-SCI), and/or a Physical Downlink Shared Channel (PUSCH)).

The HARQ-ACK may include at least a HARQ-ACK bit (HARQ-ACK information) corresponding at least to one transport block. The HARQ-ACK bit may indicate an acknowledgement (ACK) or a negative-acknowledgement (NACK) corresponding to one or multiple transport blocks. The HARQ-ACK may include at least a HARQ-ACK codebook including one or multiple HARQ-ACK bits. The fact that the HARQ-ACK bit corresponds to one or multiple transport blocks may mean that the HARQ-ACK bit corresponds to a PDSCH including the one or the multiple transport blocks. The HARQ-ACK bit may indicate an ACK or NACK corresponding to one Code Block Group (CBG) included in the transport block.

The Scheduling Request (SR) may be used at least for requesting a resource of a PUSCH for initial transmission. A scheduling request bit may be used to indicate either a positive SR or a negative SR. The scheduling request bit indicating the positive SR is also referred to as "the positive SR being transmitted". The positive SR may indicate that resources of the PUSCH for initial transmission are requested by the terminal apparatus 1. The positive SR may indicate that a scheduling request is triggered by the higher layer. The positive SR may be transmitted in a case that the higher layer indicates transmission of the scheduling request. The scheduling request bit indicating the negative SR is also referred to as "the negative SR being transmitted". The negative SR may indicate that resources of the PUSCH for initial transmission are not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality of a channel (for example, propagation intensity) and the PMI is an indicator indicating a precoder. The RI is an indicator indicating a transmission rank (or the number of transmission layers).

The PUCCH may support one or more PUCCH formats (PUCCH format 0 to PUCCH format 4). The PUCCH formats may be mapped to the PUCCH and may then be transmitted. The PUCCH format may be transmitted on the PUCCH. The fact that the PUCCH format is transmitted may mean that the PUCCH is transmitted.

The PUSCH may be used at least to transmit a transport block ((TB), the MAC PDU, a UL-SCH, and/or the PUSCH). The PUSCH may be used to transmit at least some or all of the transport block, the HARQ-ACK, the channel state information, and the scheduling request. The PUSCH is used at least to transmit a random access message 3.

The PRACH is used at least to transmit a random access preamble (random access message 1). The PRACH may be used at least to indicate some or all of an initial connection establishment procedure, a handover procedure, a connection re-establishment procedure, synchronization for PUSCH transmission (timing adjustment), and a resource request for the PUSCH. The random access preamble may be used for notifying an index (random access preamble index) that is given by a higher layer of the terminal apparatus 1 to the base station apparatus 3.

In FIG. 1, in uplink radio communication, the following uplink physical signals are used. The uplink physical signals need not be used for transmitting information output from a higher layer, but are used by a physical layer.

UpLink Demodulation Reference Signal (UL DMRS)
Sounding Reference Signal (SRS)
UpLink Phase Tracking Reference Signal (UL PTRS)

The UL WARS is related to transmission of the PUSCH and/or the PUCCH. The UL DMRS is multiplexed on the PUSCH or the PUCCH. The base station apparatus 3 may use the UL DMRS for performing channel compensation of the PUSCH or the PUCCH. In the following, concurrent transmission of the PUSCH and the UL DMRS related to the PUSCH is simply referred to as transmission of the PUSCH. In the following, concurrent transmission of the PUCCH and the UL DMRS related to the PUCCH is simply referred to as transmission of the PUCCH. The UL DMRS related to the PUSCH is also referred to as the UL DMRS for the PUSCH. The UL DMRS related to the PUCCH is also referred to as the UL DMRS for the PUCCH.

The SRS need not be related to transmission of the PUSCH or the PUCCH. The base station apparatus 3 may use the SRS for measurement of a channel state. The SRS may be transmitted at the end of a subframe in an uplink slot or in a certain number of OFDM symbols from the end.

The UL PTRS may be a reference signal that is at least used for phase tracking. The UL PTRS may be related to a UL DMRS group at least including an antenna port used for one or multiple UL DMRSs. The fact that the UL PTRS and the UL DMRS group are related to each other may mean that an antenna port of the UL PTRS and a part or all of antenna ports included in the UL DMRS group are at least QCL. The UL DMRS group may be identified based at least on an antenna port having the smallest index in the UL DMRSs included in the UL DMRS group. The UL PTRS may be mapped to an antenna port having the smallest index in one or multiple antenna ports to which one codeword is mapped. The UL PTRS may be mapped to the first layer in a case that one codeword is at least mapped to the first layer and the second layer. The UL PTRS need not be mapped to the second layer. The index of the antenna port to which the UL PTRS is mapped may be given based at least on downlink control information.

In FIG. 1, in downlink radio communication from the base station apparatus 3 to the terminal apparatus 1, the following downlink physical channels are used. The downlink physical channels are used by a physical layer for transmitting information output from a higher layer.

Physical Broadcast Channel (PBCH)
Physical Downlink Control Channel (PDCCH)
Physical Downlink Shared Channel (PDCCH)

The PBCH is used at least to transmit a Master Information Block Wm) and/or a Broadcast Channel(BCH)). The PBCH may be transmitted based on a prescribed transmission interval. The PBCH may be transmitted at an interval of 80 ms. The PBCH may be transmitted at intervals of 160 ms. Contents of information included in the PBCH may be updated at every 80 ms. A part or an entirety of the information included in the PBCH may be updated at every 160 ms. The PBCH may include 288 subcarriers. The PBCH may include 2, 3, or 4 OFDM symbols. The MIB may include information associated with an identifier (index) of a synchronization signal. The NUB may include information indicating at least a part of a number of the slot, a number of a subframe, and/or a number of a radio frame in which the PBCH is transmitted.

The PDCCH is used at least to transmit Downlink Control Information (DCI). The PDCCH may be transmitted with at least the downlink control information included therein. The PDCCH may include the downlink control information. The downlink control information is also referred to as a DCI format. The downlink control information may include at least either a downlink (DL) grant or an uplink (UL) grant. The DCI format used for scheduling the PDSCH is also referred to as a downlink DCI format. The DCI format used for scheduling the PUSCH is also referred to as an uplink DCI format. The downlink grant is also referred to as downlink (DL) assignment or downlink (DL) allocation. The uplink DCI format at least includes one or both of DCI format 0_0 and DCI format 0_1.

DCI format 0_0 includes at least some or all of 1A to 1F.
1A) DCI format identification field (Identifier for DCI formats field)
1B) Frequency domain resource allocation field (Frequency domain resource assignment field)
1C) Time domain resource allocation field (Time domain resource assignment field)
1D) Frequency hopping flag field
1E) Modulation and Coding Scheme field (MCS field)
1F) First CSI request field (First CSI request field)

The DCI format identification field may be used at least to indicate which of one or multiple DCI formats the DCI format including the DCI format identification field corresponds to. The one or multiple DCI formats may be given based at least on a part or all of DCI format 1_0, DCI format 1_1, DCI format 0_0, and/or DCI format 0_1.

The frequency domain resource assignment field may be used at least to indicate assignment of a frequency resource for the PUSCH scheduled by the DCII format including the frequency domain resource assignment field. The frequency domain resource assignment field is also referred to as Frequency Domain Resource Allocation (FDRA) field.

The time domain resource assignment field may be used at least to indicate assignment of a time resource for the PUSCH scheduled by the DCI format including the time domain resource assignment field. The time domain resource assignment field is also referred to as a Time Domain Resource Allocation (TDRA) field.

The time domain resource assignment field may be used at least to indicate assignment of a time resource for the PUSCH scheduled by the DCI format including the time domain resource assignment field.

The frequency hopping flag field may be used at least to indicate whether frequency hopping is to be applied to the PUSCH scheduled by the DCI format including the frequency hopping flag field.

The MCS field may be used at least to indicate some or all of a modulation scheme for the PUSCH scheduled by the DCI format including the MCS field and/or a target coding rate. The target coding rate may be a target coding rate for a transport block of the PUSCH. The size of the transport block (Transport Block Size (TBS)) may be provided based at least on the target coding rate.

The first CSI request field is used at least to indicate a report of the CSI. The size of the first CSI request field may be a prescribed value. The size of the first CSI request field may be zero, may be one, may be two, or may be three.

DCI format 0_1 includes at least some or all of 2A to 2G.
2A) DCI format identification field
2B) Frequency domain resource allocation field
2C) Time domain resource allocation field
2D) Frequency hopping flag field
2E) MCS field
2F) Second CSI request field
2G) BWP field The BWP field may be used for indicating an uplink BWP to which the PUSCH that is scheduled by DCI format 0_1 is mapped.

The second CSI request field is at least used for indicating the report of the CSI. The size of the second CSI request field may be given based at least on a higher layer parameter ReportTriggerSize.

The downlink DCI format at least includes one or both of DCI format 1_0 and DCI format 1_1.

DCI format 1_0 includes at least some or all of 3A to 3H.
3A) DCI format identification field (Identifier for DCI formats field)
3B) Frequency domain resource allocation field (Frequency domain resource assignment field)
3C) Time domain resource allocation field (Time domain resource assignment field)
3D) Frequency hopping flag field
3E) Modulation and Coding Scheme field (MCS field)
3F) First CSI request field (First CSI request field)
3G) PDSCH-to-HARQ feedback timing indicator field
3H) PUCCH resource indication field (PUCCH resource indicator field)

The PDSCH-to-HARQ feedback timing indicator field may be a field indicating a timing K1. In a case that the index of the slot including the last OFDM symbol of the PDSCH is a slot n, the index of the slot including the PUCCH or the PUSCH including at least HARQ-ACK corresponding to the transport block included in the PDSCH may be n+K1. In a case that the index of the slot including the last OFDM symbol of the PDSCH is a slot n, the index of the slot including the OFDM symbol at the head of the PUCCH or the OFDM symbol at the head of the PUSCH including at least HARQ-ACK corresponding to the transport block included in the PDSCH may be n+K1.

The PDSCH-to-HARQ feedback timing indicator field (PDSCH-to-HARQ feedback timing indicator field) may be hereinafter referred to as a RAW indicator field.

The PUCCH resource indicator field may be a field indicating indexes of one or multiple PUCCH resources included in the PUCCH resource set. The value included in the PUCCH resource indicator field may be the PUCCH Resource Indicator (PRI). The PRI may be used for selection (determination) of the PUCCH resource used for PUCCH transmission. The PRI may be used as an index of the higher layer parameter resourceList corresponding to a list including one or multiple PUCCH resources included in the PUCCH resource set provided by the higher layer parameter PUCCH-ResourceSet. In other words, the PRI may be used in a case of selecting one PUCCH resource from one or multiple PUCCH resources included in the higher layer parameter resourceList.

DCI format 1_1 includes at least some or all of 4A to 4J.
4A) DCI format identification field (Identifier for DCI formats field)
4B) Frequency domain resource allocation field (Frequency domain resource assignment field)
4C) Time domain resource allocation field (Time domain resource assignment field)
4D) Frequency hopping flag field
4E) Modulation and Coding Scheme field (MCS field)
4F) First CSI request field
4G) PDSCH-to-HARQ feedback timing indicator field
4H) PUCCH resource indication field (PUCCH resource indicator field)
4J) BWP field The frequency domain resource assignment field may be used at least to indicate assignment of a frequency resource for the PDSCH scheduled by the DCI format including the frequency domain resource assignment field. The frequency domain resource assignment field is also referred to as Frequency Domain Resource Allocation (FDRA) field.

The time domain resource assignment field may be used at least to indicate assignment of a time resource for the PDSCH scheduled by the DCI format including the time domain resource assignment field. The time domain resource assignment field is also referred to as a Time Domain Resource Allocation (TDRA) field.

The BWP field may be used to indicate the downlink BWP to which the PDSCH scheduled by DCI format 1_1 is mapped.

DCI format 2_0 may at least include one or multiple Slot Format Indicators (SFIs).

The downlink control information may include Unlicensed access common information. Unlicensed access common information is control information related to the access, transmission and/or reception, or the like in an unlicensed frequency band. Unlicensed access common information may be information of a downlink subframe configuration (Subframe configuration for Unlicensed Access) (slot configuration). The downlink subframe configuration (slot configuration) indicates the position of the OFDM symbol occupied in the subframe (slot) where the PDCCH including the information of the downlink subframe configuration (slot configuration) is allocated, and/or the position of the OFDM symbol occupied in the subframe (slot) next to the subframe (slot) where the PDCCH including the information of the downlink subframe configuration (slot configuration) is allocated. Downlink physical channels and downlink physical signals are transmitted and/or received in the occupied OFDM symbols. The Unlicensed access common information may be information of an uplink subframe configuration duration and offset) (slot configuration). The uplink subframe configuration (slot configuration) indicates the position of the subframe (slot) at which the uplink subframe (the uplink slot) is started based on the subframe (slot) in which the PDCCH including the information of the uplink subframe configuration (slot configuration) is allocated and the number of subframes (slots) of uplink subframes (uplink slots). The terminal apparatus 1 is not required to receive a downlink physical channel or a downlink physical signal in the subframe (slot) indicated by the information of the uplink subframe configuration (slot configuration).

For example, the downlink control information including the downlink grant or the uplink grant is transmitted and/or received on the PDCCH, along with a Cell-Radio Network Temporary Identifier (C-RNTI). For example, the Unlicensed access common information is transmitted and/or received on the PDCCH, along with a Common Control-Radio Network Temporary Identifier (CC-RNTI).

In various aspects of the present embodiment, the number of resource blocks indicates the number of resource blocks in the frequency domain unless otherwise specified.

The downlink grant is used at least for scheduling a single PDSCH in a single serving cell. The uplink grant is used at least for scheduling a single PUSCH in a single serving cell.

Note that various DCI formats may further include fields different from the fields described above. For example, the DCI formats may include a field indicating whether the HARQ-ACK information of the PDSCH is correctly detected (New Feedback Indicator (NFI) field). The DCI formats may include a field indicating whether the HARQ-ACK bit stored in a recording medium such as a memory is to be erased (flushed) (NFI field). The DCI formats may include a field indicating whether to include retransmission of a transmitted HARQ-ACK codebook (NFI field). The DCI formats may include a field indicating a PDSCH group to which the PDSCH scheduled by the DCI format belongs (is linked) (PDSCH Group II) (PGI) field). The DCI formats may include a field indicating the PDSCH group to which transmission of HARQ-ACK information is indicated (Request PDSCH Group ID (RPGI) field). The DCI formats may include a field indicating the cumulative number of PDCCHs transmitted (Counter Downlink Assignment Index (C-DAI) field). The DCI formats may include a field indicating the total number of PDCCHs transmitted (Total Downlink Assignment Index (T-DAI) field).

The terminal apparatus 1 may be associated with a PDSCH group identifier (PDSCH Group ID (PGI)) regarding each PDSCH. The PGI of a certain PDSCH may be indicated based at least on the DCI format used for scheduling of the PDSCH. For example, a field indicating the PGI (PGI field) may be included in the DCI format. For example, the PDSCH group may be a set of PDSCHs having the same PDSCH group index (PGI). The PDSCH group may be one PDSCH, or a set of one or more PDSCHs associated with the same PGI. The number of PDSCH groups configured for the terminal apparatus 1 may be 1, may be 2, may be 3, may be 4, or may be an integer of 0 or greater other than 1, 3, and 4.

A Requested PDSCH Group (RPG) may be a PDSCH group corresponding to the HARQ-ACK information transmitted (reported) via the following PUCCH or PUSCH. The RPG (requested PDSCH group) may include one PDSCH group, or may include multiple PDSCH groups. Indication of the RPG may be indicated in association with each PDSCH group in a format of a bitmap, based at least on the DCI format. The RPG may be indicated based at least on the RPGI field included in the DCI format. The terminal apparatus 1 may generate the HARQ-ACK codebook for the indicated RPG and transmit (report) the HARQ-ACK codebook via the PUCCH or the PUSCH.

The value of K1 (information or a parameter indicated by the PDSCH-to-HARQ feedback timing indicator field) indicated by the DCI format included in the PDCCH may be a numerical value (numerical), or may be a non-numerical value (non-numerical). Here, the value of the numerical value may indicate a value expressed in numbers and, for example, may be a value out of $\{0, 1, 2, \ldots, 15\}$. The value of the non-numerical value may indicate a value other than a number, or may indicate that a numerical value is not indicated. The use of the value of K1 being a numerical value and the value of K1 being a non-numerical value will be described below. For example, the PDSCH scheduled using the DCI format is transmitted in the base station apparatus 3 in slot n and is received in the terminal apparatus 1. In a case that the value of K1 indicated by the DCI format is a numerical value, the terminal apparatus 1 may transmit (report) the HARQ-ACK information corresponding to the PDSCH in slot n+K1 via the PUCCH or the PDSCH. In a case that the value of K1 indicated by the DCI format is a non-numerical value, the terminal apparatus 1 may defer reporting of the HARQ-ACK information corresponding to the PDSCH. In a case that the value of K1 being a non-numerical value is indicated by the DCI format including scheduling information of the PDSCH, the terminal apparatus 1 may defer reporting of the HARQ-ACK information corresponding to the PDSCH. For example, the terminal apparatus 1 may store the HARQ-ACK information in a recording medium such as a memory and transmit (report) the HARQ-ACK information with the transmission of the HARQ-ACK information being triggered based at least on a DCI format other than the DCI format described above, without transmitting (reporting) the HARQ-ACK information via the following PUCCH or PDSCH.

The value of K1 being a non-numerical value may be included in a higher layer parameter sequence. The higher layer parameter may be a higher layer parameter dl-Data- ToUL-ACK. The higher layer parameter may be different from the higher layer parameter dl-DataToUL-ACK. The value of K1 may be a value in the higher layer parameter sequence that is indicated by a PDSCH-to-HARQ feedback timing indicator field included in the DCI format. For example, in a case that it is assumed that the higher layer parameter sequence is set to {0, 1, 2, 3, 4, 5, 15, value of non-numerical value} and the number of bits of the PDSCH-to-HARQ feedback timing indicator field is 3, the code point "000" of the PDSCH-to-HARQ feedback timing indicator field may indicate that the value of K1 is 0, the code point "001" may indicate that the value of K1 is 1, or the code point "111" may indicate that value of K1 is the value of the non-numerical value. For example, in a case that it is assumed that the higher layer parameter sequence is set to {value of non-numerical value, 0, 1, 2, 3, 4, 5, 15} and the number of bits of the PDSCH-to-HARQ feedback timing indicator field is 3, the code point "000" of the PDSCH-to-HARQ feedback timing indicator field may indicate that the value of K1 is the value of the non-numerical value, the code point "001" may indicate that the value of K1 is 0, and the code point "111" may indicate that the value of K1 is 15.

One physical channel may be mapped to one serving cell. A single physical channel may be mapped to a single BWP configured to a single carrier included in a single serving cell.

In the terminal apparatus 1, one or multiple COntrol REsource SETs (CORESETs) may be configured. The terminal apparatus 1 monitors the PDCCH in the one or multiple control resource sets. Here, monitoring of the PDCCH in the one or multiple control resource sets may include monitoring of one or multiple PDCCHs corresponding to the one or multiple control resource sets, respectively. Note that the PDCCH may include a set of one or multiple PDCCH candidates and/or one or multiple PDCCH candidates. Also, monitoring of the PDCCH may include monitoring and detecting the PDCCH and/or a DCI format transmitted via the PDCCH.

The control resource set may indicate a time-frequency domain to which one or multiple PDCCHs can be mapped. The control resource set may be an area in which the terminal apparatus 1 monitors the PDCCH. The control resource set may include continuous resources (Localized resources). The control resource set may include non-continuous resources (distributed resources).

In the frequency domain, the unit of mapping of the control resource set may be a resource block. In the frequency domain, for example, the unit of mapping of the control resource set may be six resource blocks. In the time domain, the unit of mapping of the control resource set may be an OFDM symbol. In the time domain, for example, the unit of mapping of the control resource set may be one OFDM symbol.

Mapping of the control resource set to the resource block may be provided based at least on the higher layer parameter. The higher layer parameter may include a bitmap for a Resource Block Group (RBG). The resource block group may be provided by six continuous resource blocks.

The number of OFDM symbols included in the control resource set may be provided based at least on the higher layer parameter.

A certain control resource set may be a Common control resource set. The common control resource set may be a control resource set configured commonly to multiple terminal apparatuses 1. The common control resource set may be provided at least based on some or all of the MIB, the first system information, the second system information, the common RRC signalling, and a cell ID. For example, the time resource and/or the frequency resource of the control resource set configured to monitor the PDCCH to be used for scheduling the first system information may be provided based at least on the MIB.

The control resource set configured by the MIB is also referred to as CORESET #0. CORESET #0 may be a control resource set of index #0.

A certain control resource set may be a Dedicated control resource set. The dedicated control resource set may be a control resource set configured to be used exclusively for the terminal apparatus 1. The dedicated control resource set may be provided based at least on some or all of the dedicated RRC signalling and values of C-RNTI. Multiple control resource sets may be configured for the terminal apparatus 1 and an index (control resource set index) may be provided for each of the control resource sets. One or more control channel elements (CCEs) may be configured in the control resource set and an index (CCE index) may be provided for each of the CCEs.

A set of candidates of the PDCCH monitored by the terminal apparatus 1 may be defined from the perspective of a search space. In other words, the set of PDCCH candidates monitored by the terminal apparatus 1 may be given by a search space.

The search space may include one or multiple PDCCH candidates of one or multiple Aggregation levels. The aggregation level of the PDCCH candidates may indicate the number of CCEs constituting the PDCCH. The PDDCH candidate may be mapped to one or multiple CCEs.

The terminal apparatus 1 may monitor at least one or multiple search spaces in the slot in which DRX (Discontinuous reception) is not configured. The DRX may be provided based at least on a higher layer parameter. The terminal apparatus 1 may monitor at least one or multiple Search space sets in the slot in which DRX is not configured. Multiple search space sets may be configured for the terminal apparatus 1. An index (search space set index) may be provided for each of the search space sets.

The search space set may at least include one or multiple search spaces. An index (search space index) may be provided for each of the search spaces.

Each search space set may be associated at least with one control resource set. Each search space set may be included in one control resource set. For each of the search space sets, the index of the control resource set related to the search space set may be given.

The search space may include two types, i.e., Common Search Space (CSS) and UE-specific Search Space (USS). The CSS may be a search space configured commonly to multiple terminal apparatuses 1. The USS may be a search space including a configuration to be dedicatedly used for the individual terminal apparatus 1. The CSS may be provided based at least on the synchronization signal, the NUB, the first system information, the second system information, the common RRC signalling, the dedicated RRC signalling cell ID, or the like. The USS may be provided based at least on the dedicated RRC signalling and/or the value of C-RNTI. The CSS may be a search space configured in a resource (control resource element) common to multiple terminal apparatuses 1. The USS may be a search space configured in a resource (control resource element) for each individual terminal apparatus 1.

The CSS may include a Type-0 PDCCH CSS for the DCI format scrambled with an SI-RNTI used to transmit system information in the primary cell and a Type-1 PDCCH CSS for the DCI format scrambled with an RA-RNTI and a TC-RNTI used for initial access. The CSS may use a PDCCH CSS of a type for the DCI format scrambled with the CC-RNTI used for Unlicensed access. The terminal apparatus 1 can monitor PDCCH candidates in the search spaces. The DCI format scrambled with the prescribed RNTI may be a DCI format to which a Cyclic Redundancy Check (CRC) scrambled with the prescribed RNTI is added.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as a Radio Network Temporary Identifier (RNTI). Information related to reception of the PDCCH may include information related to the ID used for scrambling the CRC bits added to the PDCCH. The terminal apparatus 1 may attempt to receive the PDCCH based on at least the information relating to the ID included in the PBCH.

The RNTI may include a System Information-RNTI (SI-RNTI), a Paging-RNTI (P-RNTI), a Common RNTI (C-RNTI), a Temporary C-RNTI (TC-RNTI), a Random Access-RNTI (RA-RNTI), a Common Control-RNTI (CC-RNTI), and an Interruption-RNTI (INT-RNTI). The SI-RNTI is used at least for scheduling the PDSCH transmitted with system information included therein. The P-RNTI is used at least for scheduling the PDSCH transmitted with paging information and/or information such as notification of change of the system information included therein. The C-RNTI is used at least for scheduling user data to the terminal apparatus 1 in RRC connection. The Temporary C-RNTI is used at least for scheduling a random access message 4. The Temporary C-RNTI is used at least for scheduling of the PDSCH including data to be mapped to a CCCH in the logical channel. The RA-RNTI is used at least for scheduling of the random access message 2. The CC-RNTI is used at least for transmission and/or reception of the control information for the Unlicensed access. The INT-RNTI is used at least to indicate Pre-emption in the downlink.

Note that the PDCCH and/or the DCI included in the CSS need not include a Carrier Indicator Field (CIF) indicating which serving cell (or which component carrier) the PDCCH and/or the DCI is scheduling the PDSCH or PUSCH for.

Note that in a case that carrier aggregation (CA) in which communication (transmission and/or reception) is performed by aggregating multiple serving cells and/or multiple component carriers is configured for the terminal apparatus 1, then the PDCCH and/or the DCI included in the USS for the prescribed serving cell (prescribed component carrier) may include the CIF indicating which serving cell and/or which component carrier the PDCCH and/or the DCI is scheduling the PDSCH or PUSCH for.

Note that in a case that communication is performed using one serving cell and/or one component carrier for the terminal apparatus 1, the PDCCH and/or the DCI included in the USS need not include the CIF indicating which serving cell and/or which component carrier the PDCCH and/or the DCI is scheduling the PDSCH or PUSCH for.

The common control resource set may include the CSS. The common control resource set may include both of the CSS and the USS. The dedicated control resource set may include the USS. The dedicated control resource set may include the CSS.

The physical resources of the search space include configuration units (Control Channel Elements (CCEs)) of a control channel. The CCE includes a prescribed number of Resource Element Groups (REGs). For example, the CCE may include six REGs. The REG may include one Physical Resource Block (PRB) during one OFDM symbol. In other words, the REG may include 12 Resource Elements (REs). The PRB is also simply referred to as a Resource Block (RB).

The PDSCH is used at least to transmit/receive the transport block. The PDSCH may be used at least to transmit/receive a random access message 2 (random access response). The PDSCH may be used at least to transmit/receive system information including parameters used for initial access.

In FIG. 1, in downlink radio communication, the following downlink physical signals are used. The downlink physical signals need not be used for transmitting information output from a higher layer, but are used by a physical layer.

Synchronization Signal (SS)
Downlink DeModulation Reference Signal (DL DMRS)
Channel State Information-Reference Signal (CST-RS)
Downlink Phase Tracking Reference Signal (DL PTRS)

The synchronization signal is used by the terminal apparatus 1 to establish synchronization with a downlink frequency domain and/or time domain. The synchronization signal includes a Primary Synchronization Signal (PSS) and a Secondary Synchronization Signal (SSS).

An SS block (SS/PBCH block) includes at least some or all of the PSS, the SSS, and the PBCH.

The DL DMRS is related to transmission of the PBCH, the PDCCH, and/or the PDSCH. The DL DMRS is multiplexed on the PBCH, the PDCCH, and/or the PDSCH. In order to channel compensation of the PBCH, the PDCCH, or the PDSCH, the terminal apparatus 1 may use the DL DMRS corresponding to the PBCH, the PDCCH, or the PDSCH.

The CSI-RS may be a signal used at least to calculate channel state information. A pattern of the CSI-RS assumed by the terminal apparatus may be provided at least by a higher layer parameter.

The PTRS may be a signal that is at least used for compensation of phase noise. A pattern of the PTRS assumed by the terminal apparatus may be provided based at least on a higher layer parameter and/or the DCI.

The DL PTRS may be related to the DL DMRS group at least including an antenna port used for one or multiple DL DMRSs.

The downlink physical channel and the downlink physical signal are also collectively referred to as the downlink signal. The uplink physical channel and the uplink physical signal are also collectively referred to as the uplink signal. The downlink signal and the uplink signal are also collectively referred to as the physical signal. The downlink signal and the uplink signal are also collectively referred to as the signal. The downlink physical channel and the uplink physical channel are collectively referred to as the physical channel. The downlink physical signal and the uplink physical signal are collectively referred to as the physical signal.

A Broadcast Channel (BCH), an Uplink-Shared CHannel (UL-SCH), and a Downlink-Shared Channel (DL-SCH) are transport channels. A channel used in a Medium Access Control (MAC) layer is referred to as a transport channel. A unit of the transport channel used in the MAC layer is also referred to as a transport block (TB) or an MAC PDU. Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword and modulation processing is performed for each codeword.

The base station apparatus 3 and the terminal apparatus 1 exchange (transmit and/or receive) a higher layer signaling in a higher layer. For example, the base station apparatus 3 and the terminal apparatus 1 may transmit and/or receive, in a Radio Resource Control (RRC) layer, RRC signalling (a Radio Resource Control (RRC) message and/or Radio Resource Control (RRC) information). The base station apparatus 3 and the terminal apparatus 1 may transmit and/or receive an MAC Control Element (CE) in the MAC layer. Here, the RRC signalling and/or the MAC CE is also referred to as a higher layer signaling.

The PUSCH and the PDSCH may be at least used for transmitting the RRC signalling and/or the MAC CE. Here, the RRC signalling transmitted on the PDSCH from the base station apparatus 3 may be signaling that is common to multiple terminal apparatuses 1 in a serving cell. The signaling common to the multiple terminal apparatuses 1 in the serving cell is also referred to as common RRC signalling. The RRC signalling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signalling. A serving cell-specific higher layer parameter may be transmitted/received by using the signaling common to the multiple terminal apparatuses 1 in the serving cell or the signaling dedicated to a certain terminal apparatus 1. A UE-specific higher layer parameter may be transmitted/received by using signaling dedicated to a certain terminal apparatus 1.

A Broadcast Control CHannel (BCCH), a Common Control CHannel (CCCH), and a Dedicated Control CHannel (DCCH) are logical channels. For example, the BCCH is a channel of a higher layer that is used for transmitting/receiving the MIB. The Common Control CHannel (CCCH) is a channel of a higher layer that is used for transmitting/receiving common information in multiple terminal apparatuses 1. Here, the CCCH may be, for example, used for the terminal apparatus 1 that is not in a state of RRC connection. The Dedicated Control CHannel (DCCH) is a channel of a higher layer that is at least used for transmitting/receiving control information (dedicated control information) that is dedicated to the terminal apparatus 1. Here, the DCCH may be, for example, used for the terminal apparatus 1 that is in a state of RRC connection.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

In a certain component carrier, New Radio—Unlicensed (NR-U) may be applied. In a certain serving cell, NR-U may be applied. A fact that NR-U is applied in a certain component carrier (or a certain serving cell) may at least include a technique (framework, configuration) including a part or all of the following element A1 to element A6.

Element A1: In the certain component carrier (or the certain serving cell), the second SS burst set is configured Element A2: The base station apparatus 3 transmits the second SS/PBCH block in the certain component carrier (or the certain serving cell)

Element A3: The terminal apparatus 1 receives the second SS/PBCH block in the certain component carrier (or the certain serving cell)

Element A4: The base station apparatus 3 transmits the PDCCH in the second Type-0 PDCCH common search space set in the certain component carrier (or the certain serving cell)

Element A5: The terminal apparatus 1 receives the PDCCH in the second Type-0 PDCCH common search space set in the certain component carrier (or the certain serving cell)

Element A6: A higher layer parameter (for example, a field included in the MIB) related to NR-U indicates a first value (for example, 1)

In a certain component carrier, New Radio-Unlicensed (NR-U) need not be applied. In a certain serving cell, NR-U need not be applied. A fact that NR-U is not applied in a certain component carrier (or a certain serving cell) may at least include a technique (framework, configuration) including a part or all of the following element B1 to element B6.

Element B1: In the certain component carrier (or the certain serving cell), the first SS burst set is configured Element B2: The base station apparatus 3 transmits the first SS/PBCH block in the certain component carrier (or the certain serving cell)

Element B3: The terminal apparatus 1 receives the first SS/PBCH block in the certain component carrier (or the certain serving cell)

Element B4: The base station apparatus 3 transmits the PDCCH in the first Type-0 PDCCH common search space set in the certain component carrier (or the certain serving cell)

Element B5: The terminal apparatus 1 receives the PDCCH in the first Type-0 PDCCH common search space set in the certain component carrier (or the certain serving cell)

Element B6: A higher layer parameter (for example, a field included in the NEB) related to NR-U indicates a value (for example, 0) different from the first value The certain component carrier may be configured in a licensed band. The certain serving cell may be configured in a licensed band. Here, a fact that the certain component carrier (or the certain serving cell) is configured in a licensed band may at least include a part or all of the following configuration 1 to configuration 3.

Configuration 1: A higher layer parameter indicating operation in a licensed band for the certain component carrier (or the certain serving cell) is given, or a higher layer parameter indicating operation in an unlicensed band for the certain component carrier (or the certain serving cell) is not given Configuration 2: The certain component carrier (or the certain serving cell) is configured so as to operate in a licensed band, or the certain component carrier (or the certain serving cell) is not configured so as to operate in an unlicensed band Configuration 3: The certain component carrier (or the certain serving cell) is included in a licensed band, or the certain component carrier (or the certain serving cell) is not included in an unlicensed band The licensed band may be such a band that the radio station license is required for the terminal apparatus that operates (is expected to operate) in the licensed band. The licensed band may be a band in which only terminal apparatuses manufactured by an operator (business entity, business, organization, company) with radio station license are allowed to operate. The unlicensed band may be such a band that the channel access procedure prior to transmission of the physical signal is not required.

The unlicensed band may be such a band that the radio station license is not required for the terminal apparatus that operates (is expected to operate) in the unlicensed band. The unlicensed band may be such a band in which terminal apparatuses manufactured by a part or all of an operator with the radio station license and/or an operator without the radio station license are allowed to operate. The unlicensed band may be such a band that the channel access procedure prior to transmission of the physical signal is required.

Whether or not NR-U is applied to the certain component carrier (or the certain serving cell) may be determined based on whether or not at least the certain component carrier (or the certain serving cell) is configured for a band that can be operated in the unlicensed band (for example, a band that can be operated only in the unlicensed band). For example, a list of bands designed for NR or carrier aggregation of NR may be defined. For example, in a case that a certain band is included in a band in which one or multiple bands in the list can be operated in the unlicensed band (for example, a band that can be operated only in the unlicensed band), NR-U may be applied to the certain band. In a case that a certain band is not included in a band in which one or multiple bands in the list can be operated in the unlicensed band (for example, a band that can be operated only in the unlicensed band), NR-U need not be applied to the certain band and normal NR (for example, NR of release 15, or NR other than NR-U of release 16) may be applied.

Whether or not NR-U is applied to the certain component carrier (or the certain serving cell) may be determined based on whether or not at least the component carrier (or the serving cell) is configured for a band in which NR-U can be operated (for example, a band that can be operated only in NR-U). For example, in a case that a certain band is included in a band in which one or multiple bands in the list can be operated in NR-U (for example, a band that can be operated only in NR-U), NR-U may be applied to the certain band. In a case that a certain band is not included in a band in which one or multiple bands in the list can be operated in NR-U (for example, a band that can be operated only in NR-U), NR-U need not be applied to the certain band and normal NR (for example, NR of release 15, or NR other than NR-U of release 16) may be applied.

Whether or not NR-U is applied to the certain component carrier (or the certain serving cell) may be determined based on the NEB or information included in the system information. For example, in a case that information indicating whether or not NR-U is applied is included in the MIB (or the system information) and the information indicates application of NR-U, may be applied to the serving cell associated with the MIB (or the system information). In contrast, in a case that the information does not indicate application of NR-U, NR-U need not be applied to the serving cell associated with the MIB (or the system information) and normal NR may be applied thereto. Alternatively, the information may indicate whether or not operation is possible in the unlicensed band.

The certain component carrier may be configured in the unlicensed band. The certain serving cell may be configured in the unlicensed band. Here, a fact that the certain component carrier (or the certain serving cell) is configured in the unlicensed band may at least include a part or all of the following configuration 4 to configuration 6.

Configuration 4: A higher layer parameter indicating operation in the unlicensed band is given to the certain component carrier (or the certain serving cell)

Configuration 5: The certain component carrier (or the certain serving cell) is configured so as to operate in the unlicensed band Configuration 6: The certain component carrier (or the certain serving cell) is included in the unlicensed band In the following, description is given on the assumption that the component carrier is configured in the licensed band or is configured in the unlicensed band. Note that "the component carrier is configured in the licensed band" may mean "the serving cell is configured in the licensed band" and "the component carrier is configured in the unlicensed band" may mean "the serving cell is configured in the unlicensed band".

Whether the terminal apparatus 1 receives a first SS/PBCH block or receives a second SS/PBCH block in a certain component carrier may be given based at least on a part or all of whether or not NR-U is applied in the certain component carrier and whether or not the certain component carrier is configured in the unlicensed band.

For example, in a case that the certain component carrier is configured in the licensed band, the terminal apparatus 1 may receive the first SS/PBCH block. In a case that the certain component carrier is configured in the licensed band, the terminal apparatus 1 may receive the first PDCCH in the first Type-0 PDCCH common search space set. In a case that the certain component carrier is configured in the licensed band, the base station apparatus 3 may transmit the first SS/PBCH block. In a case that the certain component carrier is configured in the licensed band, the base station apparatus 3 may receive the first PDCCH in the first Type-0 PDCCH common search space set.

In a case that the certain component carrier is configured in the unlicensed band, the terminal apparatus 1 may receive the second SS/PBCH block. In a case that the certain component carrier is configured in the unlicensed band, the terminal apparatus 1 may receive the second PDCCH in the second Type-0 PDCCH common search space set. In a case that the certain component carrier is configured in the unlicensed band, the base station apparatus 3 may transmit the second SS/PBCH block. In a case that the certain component carrier is configured in the unlicensed band, the base station apparatus 3 may receive the second PDCCH in the second Type-0 PDCCH common search space set.

For example, in a case that NR-U is not applied in the certain component carrier and the component carrier is configured in the licensed band, the terminal apparatus 1 may receive the first SS/PBCH block. In a case that NR-U is not applied in the certain component carrier and the component carrier is configured in the licensed band, the terminal apparatus 1 may receive the first PDCCH in the first Type-0 PDCCH common search space set. In a case that NR-U is not applied in the certain component carrier and the component carrier is configured in the licensed band, the base station apparatus 3 may transmit the first SS/PBCH block. In a case that NR-U is not applied in the certain component carrier and the component carrier is configured in the licensed band, the base station apparatus 3 may receive the first PDCCH in the first Type-0 PDCCH common search space set.

For example, in a case that NR-U is not applied in the certain component carrier and the component carrier is configured in the unlicensed band, the terminal apparatus 1 may receive the second SS/PBCH block. In a case that NR-U is not applied in the certain component carrier and the component carrier is configured in the unlicensed band, the terminal apparatus 1 may receive the first PDCCH in the second Type-0 PDCCH common search space set. In a case that NR-U is not applied in the certain component carrier and the component carrier is configured in the unlicensed band, the base station apparatus 3 may transmit the second SS/PBCH block. In a case that NR-U is not applied in the certain component carrier and the component carrier is configured in the unlicensed band, the base station apparatus 3 may receive the first PDCCH in the second. Type-0 PDCCH common search space set.

For example, in a case that NR-U is applied in the certain component carrier and the component carrier is configured in the licensed band, the terminal apparatus 1 may receive the second SS/PBCH block. In a case that NR-U is applied in the certain component carrier and the component carrier is configured in the licensed band, the terminal apparatus 1 may receive the first PDCCH in the second Type-0 PDCCH common search space set. In a case that NR-U is applied in the certain component carrier and the component carrier is configured in the licensed band, the base station apparatus 3 may transmit the second SS/PBCH block. In a case that NR-U is applied in the certain component carrier and the component carrier is configured in the licensed band, the base station apparatus 3 may receive the first PDCCH in the second Type-0 PDCCH common search space set.

For example, in a case that NR-U is applied in the certain component carrier and the component carrier is configured in the unlicensed band, the terminal apparatus 1 may receive the second SS/PBCH block. In a case that NR-U is applied in the certain component carrier and the component carrier is configured in the unlicensed band, the terminal apparatus 1 may receive the first PDCCH in the second Type-0 PDCCH common search space set. In a case that NR-U is applied in the certain component carrier and the component carrier is configured in the unlicensed band, the base station apparatus 3 may transmit the second SS/PBCH block. In a case that NR-U is applied in the certain component carrier and the component carrier is configured in the unlicensed band, the base station apparatus 3 may receive the first PDCCH in the second Type-0 PDCCH common search space set.

In the following, a configuration example of the terminal apparatus 1 according to an aspect of the present embodiment will be described.

Figure 4:
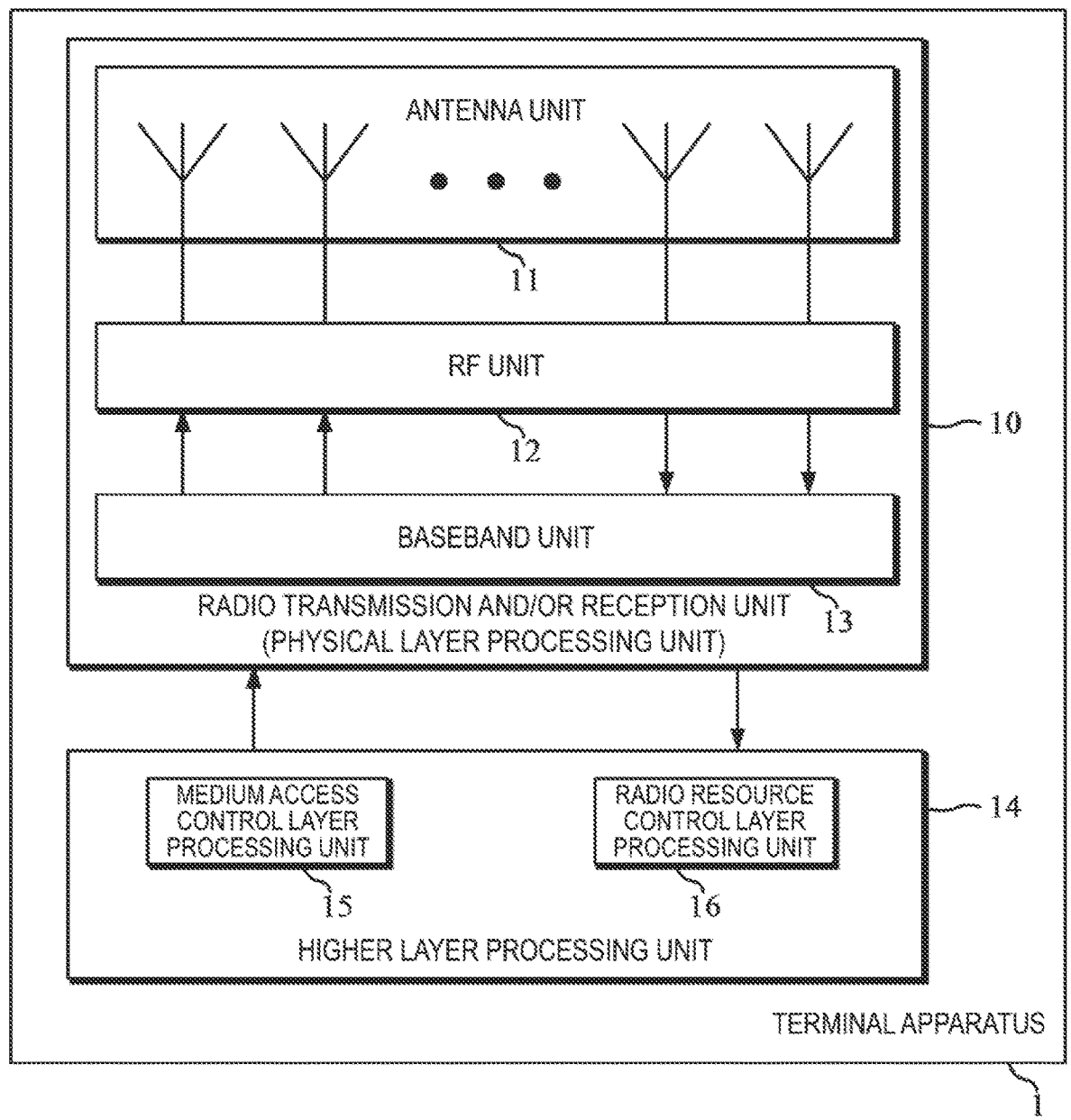
FIG. 4 is a schematic block diagram illustrating a configuration of a terminal apparatus 1 according to an aspect of the present embodiment.

FIG. 4 is a schematic block diagram illustrating a structure of the terminal apparatus 1 according to an aspect of the present embodiment. As illustrated in the figure, the terminal apparatus 1 includes a radio transmission and/or reception unit 10 and a higher layer processing unit 14. The radio transmission and/or reception unit 10 at least includes a part or all of an antenna unit 11, a Radio Frequency (RF) unit 12, and a baseband unit 13. The higher layer processing unit 14 at least includes a part or all of a medium access control layer processing unit 15 and a radio resource control layer processing unit 16. The radio transmission and/or reception unit 10 is also referred to as a transmitter, a receiver, or a physical layer processing unit. The transmitter may transmit a physical signal and/or a physical channel. The physical signal may include an uplink demodulation reference signal and/or a sounding reference signal. The physical channel may include the PRACH, the PUCCH, and/or the PUSCH. The transmitter may transmit a part or all of the PRACH, the PUCCH, and the PUSCH. The receiver may receive a physical signal and/or a physical channel. The physical signal may include a downlink demodulation reference signal, a channel state information reference signal, and/or a synchronization signal. The physical channel may include the PBCH, the PDCCH, and/or the PDSCH. The receiver may receive a part or all of the PBCH, the PDCCH, and/or the PDSCH.

The higher layer processing unit 14 outputs uplink data (transport block) generated by a user operation or the like to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. Note that the configuration information may include information related to the processing or configurations of the physical channel, the physical signal (that is, the physical layer), the MAC layer, the PDCP layer, the RLC layer, and the RRC layer. The parameters may be higher layer parameters.

The radio transmission and/or reception unit 10 performs processing of the physical layer, such as modulation, demodulation, coding, and decoding. The radio transmission and/or reception unit 10 separates, demodulates, and decodes a received physical signal, and outputs the decoded information to the higher layer processing unit 14. The radio transmission and/or reception unit 10 generates a physical signal by performing modulation and coding of data and generating a baseband signal (conversion into a time-continuous signal) and transmits the physical signal to the base station apparatus 3.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (ITT) on the signal from which the CP has been removed and extracts a signal in the frequency domain.

The baseband unit 13 generates an OFDM symbol by performing Inverse Fast Fourier Transform (IFFT) on the data, adds CP to the generated OFDM symbol, generates a baseband digital signal and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. The RF unit 12 may have a function of controlling transmission power. The RF unit 12 is also referred to as a transmission power control unit.

In the following, a configuration example of the base station apparatus 3 according to an aspect of the present embodiment will be described.

Figure 5:
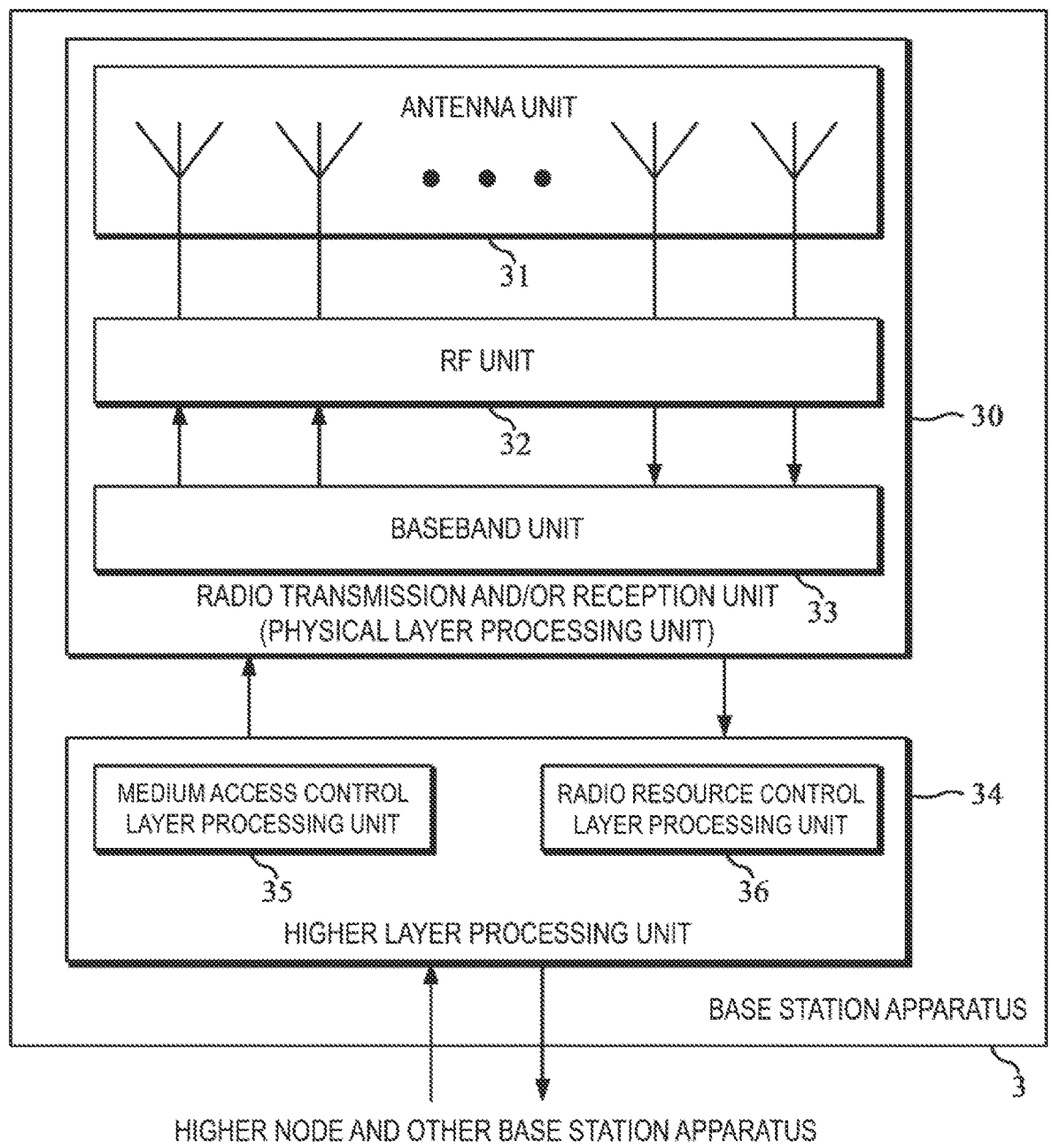
FIG. 5 is a schematic block diagram illustrating a configuration of a base station apparatus 3 according to an aspect of the present embodiment.

FIG. 5 is a schematic block diagram illustrating a structure of the base station apparatus 3 according to an aspect of the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, or a physical layer processing unit. The receiver may receive a physical signal and/or a physical channel. The physical signal may include an uplink demodulation reference signal and/or a sounding reference signal. The physical channel may include the PRACH, the PUCCH, and/or the PUSCH. The transmitter may receive a part or all of the PRACH, the PUCCH, and the PUSCH. The transmitter may transmit a physical signal and/or a physical channel. The physical signal may include a downlink demodulation reference signal, a channel state information reference signal, and/or a synchronization signal. The physical channel may include the PBCH, the PDCCH, and/or the PDSCH. The transmitter may transmit a part or all of the PBCH, the PDCCH, and/or the PDSCH.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) mapped to a PDSCH, system information, an RRC message, an MAC CE, and the like, and outputs the data to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. Note that the configuration information may include information related to the processing or configurations of the physical channel, the physical signal (that is, the physical layer), the MAC layer, the PDCP layer, the RLC layer, and the RRC layer. The parameters may be higher layer parameters.

The functionality of the radio transmission and/or reception unit 30 is similar to the functionality of the radio transmission and/or reception unit 10 and description thereof will thus be omitted.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

The terminal apparatus 1 may perform Carrier sense prior to transmission of a physical signal. Also, the base station apparatus 3 may perform carrier sense prior to transmission of a physical signal. The carrier sense may be to perform Energy detection on a Radio channel. Whether the physical signal can be transmitted may be provided based on the carrier sense performed prior to transmission of the physical signal. In a case that the amount of energy detected in carrier sense performed prior to transmission of a physical signal is greater than a prescribed threshold value, for example, the transmission of the physical channel may not be performed, or it may be determined that the transmission is not possible. Also, in a case that the amount of energy detected in the carrier sense performed prior to the transmission of the physical signal is smaller than the prescribed threshold value, the transmission of the physical channel may be performed, or it may be determined that the transmission is possible. Moreover, in a case that the amount of energy detected in the carrier sense performed prior to the transmission of the physical signal is equal to the prescribed threshold value, the transmission of the physical channel may be performed or may not be performed. In other words, in a case that the amount of energy detected in the carrier sense performed prior to the transmission of the physical signal is equal to the prescribed threshold value, it may be determined that the transmission is not possible, or it may be determined that the transmission is possible.

A procedure in which whether the transmission of the physical channel is possible based on the carrier sense is also referred to as Listen Before Talk (LBT). A situation in which the transmission of the physical signal is determined to be not possible as a result of the LBT is also referred to as a busy state or busy. For example, the busy state may be a state in which the amount of energy detected in the carrier sense is greater than the prescribed threshold value. In addition, the situation in which the transmission of the physical signal is determined to be possible as a result of the LBT is also referred to as an idle state or idle. For example, the idle state may be a state in which the amount of energy detected in the carrier sense is smaller than the prescribed threshold value. Determination that transmission of the physical signal is not possible as a result of the LIST is also referred to as an LBT failure.

The value of the intervals at which the channel is continuously occupied (Channel Occupancy Time (COT)) may be predetermined for each country or for each frequency band. The base station apparatus 3 may notify the terminal apparatus 1 of the channel occupancy time. The terminal apparatus 1 recognizes the length of the channel occupancy time and can determine the timing at which the channel occupancy time ends. For example, the maximum value of the COT may be one of 2 ms, 3 ms, 6 ms, 8 ms, and 10 ms.

The terminal apparatus 1 may multiplex uplink control information (UCI) to the PUCCH and transmit the PUCCH. The terminal apparatus 1 may multiplex the UCI to the PUSCH and transmit the PUSCH. The UCI may include at least one of downlink Channel State information (CSI), a Scheduling Request (SR) indicating a request for a PUSCH resource, and Hybrid Automatic Repeat request ACKnowledgement (HARQ-ACK) for downlink data (a Transport block, a Medium Access Control Protocol Data Unit (MAC PDU), a Downlink-Shared. Channel (DL-SCH), a Physical Downlink Shared Channel (PDSCH)).

The HARQ-ACK may also be referred to as an ACK/NACK, HARQ feedback, HARQ-ACK feedback, a HARQ response, a HARQ-ACK response, HARQ information, HARQ-ACK information, HARQ control information, and HARQ-ACK control information.

The semi-persistent scheduling (SPS) PDSCH may be configured by higher layer parameters at each BWP in a certain serving cell. The SPS PDSCH may be activated or deactivated for each serving cell. The SPS PDSCH may be activated or deactivated independently between the serving cells. The SPS (Semi-Persistent Scheduling) PDSCH may be a PDSCH that is semi-persistently scheduled for the terminal apparatus 1.

In the downlink SPS PDSCH, the downlink (DL) assignment may be provided by the PDCCH and stored based on L1 signaling indicating the activation of the SPS. In the downlink SPS PDSCH, the downlink (DL) assignment may be provided by the PDCCH and initialized (cleared) based on L1 signaling indicating the deactivation of the SPS.

In a case that the SPS PDSCH is configured, the higher layer (RRC) may configure some or all of the parameters for cs-RNTI, nrofHARQ-Processes, and periodicity. Here, the cs-RNTI may be the value of the RNTI for activation of the SPS PDSCH, or deactivation of the SPS PDSCH, or retransmission of the SPS PDSCH. The nrofHARQ-Processes may be the number of HARQ processes configured for the SPS PDSCH. The periodicity may be the periodicity of the DL assignment configured for the SPS PDSCH.

In a case that the SPS PDSCH is released or deactivated by the higher layer, a part or all of the corresponding configurations may be released. A part or all of the corresponding configurations may be initialized in a case that the SPS PDSCH is released or deactivated by the higher layer.

After the DL assignment for the SPS PDSCH is configured, the MAC entity may consider that the $N_{DA}$th DL assignment in the slot $n_{DAslot}$ indicated by Equation 1 occurs sequentially. Here, $n_{DAslot}$ may be given by (numberOfSlotsPerFrame*$SFN_{DA}$+$n_{DAslot}$)={(numberOfSlotsPerFrame*$SFN_{start\_time}$+$slot_{start\_time}$)+$N_{DA}$*periodicity*numberOfSlotsPerFrame/10}mod (1024*numbeOfSlotsPerFrame). Here, numberOfSlotsPerFrame may be the number of continuous slots included in one Radio frame. numberOfSlotsPerFrame may be the number of slots constituting one Radio frame. numberOfSlotsPerFrame may be 10, may be 20, may be 40, may be 80, or may be 160. $SFN_{DA}$ may be a Radio frame number including a slot nDAslot. $SFN_{start\_time}$ may be a Radio frame number including a slot in which the SPS PDSCH is transmitted for the first time after the DL assignment is initialized (activated) or reinitialized (re-activated). $slot_{start\_time}$ may be the number of the slot in which the SPS PDSCH is transmitted for the first time after the DL assignment is initialized (activated) or reinitialized (re-activated). The periodicity may be given by a higher layer parameter. The periodicity may be 10, may be 20, may be 32, may be 40, may be 64, may be 80, may be 128, may be 160, may be 320, or may be 640.

For the HARQ process for the SPS PDSCH, one or multiple HARQ processes may be configured by the higher layer parameter nrofHARQ-Processes. The HARQ process ID included in the HARQ process for the SPS PDSCH may be used as the HARQ process ID included in the HARQ process for the PDSCH scheduled by the DL grant included in the DCI format, and vice versa. The HARQ process ID included in the HARQ process for the SPS PDSCH may be different from the HARQ process ID included in the HARQ process for the PDSCH scheduled by the DL grant included in the DCI format.

The terminal apparatus 1 may report (transmit), to the base station apparatus 3, the HARQ-ACK information corresponding to the SPS PDSCH by using the PUCCH. The PUCCH may be configured using PUCCH format0. The PUCCH may be configured using PUCCH format1. The PUCCH may be configured using PUCCH format0 for NR-U. The PUCCH may be configured using PUCCH format1 for NR-U.

A resource for the PUCCH (PUCCH resource) for transmission of the HARQ-ACK information corresponding to the SPS PDSCH may be configured based on the DCI format for activating the SPS PDSCH. The terminal apparatus 1 may continue to use the PUCCH resource configured by the DCI format after the SPS PDSCH is activated and until the SPS PDSCH is deactivated. The terminal apparatus 1 may continue to use, for reception of the SPS PDSCH, the information (parameters) related to the DL assignment included in the DCI format used for activation of the SPS PDSCH, after the SPS PDSCH is activated and until the SPS PDSCH is deactivated.

The terminal apparatus 1 need not expect reception of the PDCCH except the PDCCH including the DCI format for activating and deactivating the SPS PDSCH for scheduling of the SPS PDSCH. The terminal apparatus 1 need not expect reception of the PDCCH except the PDCCH including the DCI format for activating and deactivating the SPS PDSCH for scheduling of new transmission of the SPS PDSCH.

Figure 6:
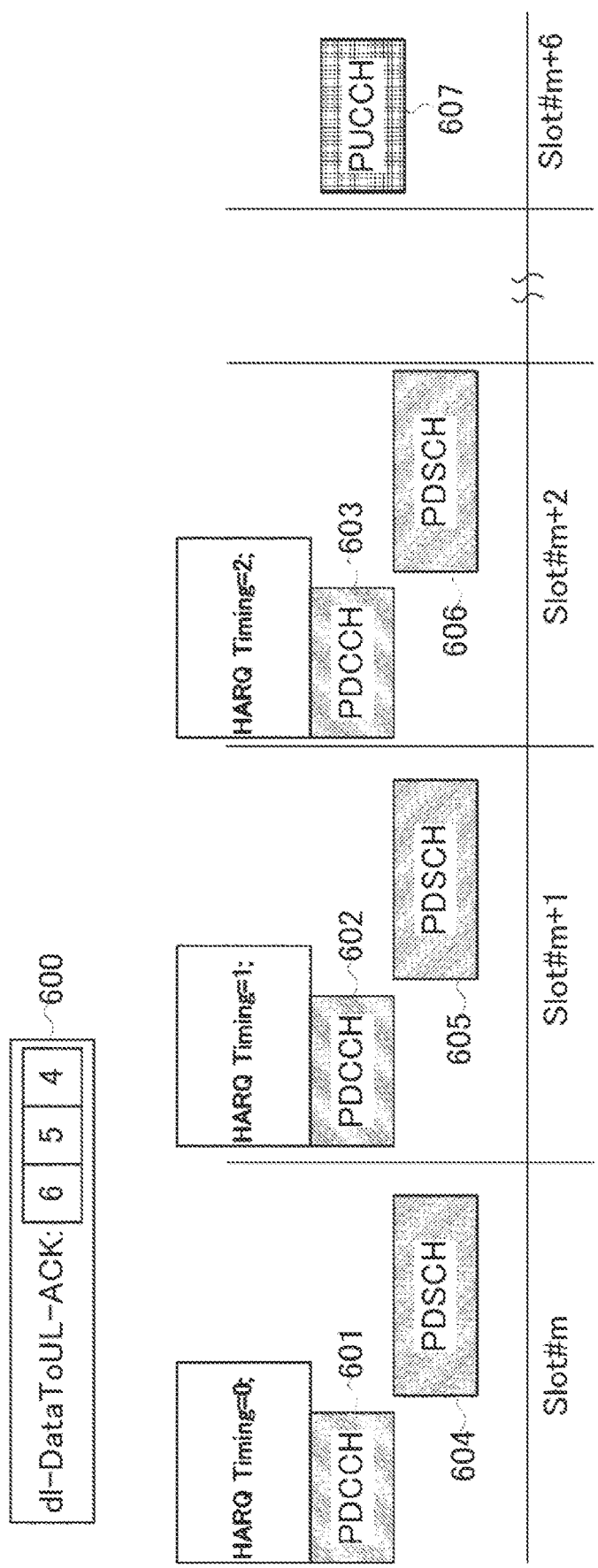
FIG. 6 is a diagram illustrating an example of reception of SPS PDSCHs according to the present embodiment.

FIG. 6 is a diagram illustrating an example of reception of the SPS PDSCH according to the present embodiment. In FIG. 6, the periodicity of the SPS PDSCH is assumed to be $p_x$. A PDCCH 601 may be a PDCCH including the DCI format for activating the SPS PDSCH. An SPS PDSCH 602 is the first PDSCH activated with the DCI format included in the PDCCH 601. The terminal apparatus 1 may determine, based on the value of K1 included in the DCI format with which the SPS PDSCH included in the PDCCH 601 is activated, the slot in which the PUCCH transmitting the HARQ-ACK information corresponding to the SPS PDSCH 602 is present. For example, since K1 is 1 in FIG. 6, the terminal apparatus 1 may transmit, by using the PUCCH 603, the HARQ-ACK information corresponding to the SPS PDSCH 602 in a slot succeeding the slot in which the terminal apparatus 1 receives the SPS PDSCH 602 and which is used as a reference, in other words, in Slot #m+1.

In FIG. 6, the SPS PDSCH 604 and the SPS PDSCH 606 may be PDSCHs with no PDCCH indicating scheduling of the PDSCH. The terminal apparatus 1 may determine, based on the value of K1 included in the DCI format with which the SPS PDSCH included in the PDCCH 601 is activated, the slot in which the PUCCH transmitting the HARQ-ACK information corresponding to the SPS PDSCH 604 is present. For example, since K1 is 1 in FIG. 6, the terminal apparatus 1 may transmit, by using the PUCCH 605, the HARQ-ACK information corresponding to the SPS PDSCH 604 in a slot succeeding the slot in which the terminal apparatus 1 receives the SPS PDSCH 604 and which is used as a reference, in other words, in Slot $\pi m+p_x+1$. The terminal apparatus 1 may determine the slot in which the PUCCH transmitting the HARQ-ACK information corresponding to the SPS PDSCH 606 is present, based on the value of K1 included in the DCI format with which the SPS PDSCH included in the PDCCH 601 is activated. For example, since K1 is 1 in FIG. 6, the terminal apparatus 1 may transmit, by using the PUCCH 607, the HARQ-ACK information corresponding to the SPS PDSCH 606 in a slot succeeding the slot in which the terminal apparatus 1 receives the SPS PDSCH 606 and which is used as a reference, in other words, in Slot #m+$jp_x$+1. Here, j may be an integer of 1 or greater.

In FIG. 6, a PDCCH 608 may be a PDCCH including the DCI format for deactivating SPS PDSCH. The terminal apparatus 1 may generate HARQ-ACK information corresponding to whether the SPS PDSCH has been successfully deactivated by the PDCCH 608. In other words, the terminal apparatus 1 may generate an ACK in a case that the SPS PDSCH has been successfully deactivated by the PDCCH 608. The terminal apparatus 1 may generate a NACK in a case that the deactivation of the SPS PDSCH by the PDCCH 608 is failed. The terminal apparatus 1 may determine the HARQ-ACK information corresponding to the deactivation of the SPS PDSCH based on the value of K1 included in the DCI format with which the SPS PDSCH included in the PDCCH 601 is activated. For example, since K1 included in the DCI format included in the PDCCH 608 is 1 in FIG. 6, the terminal apparatus 1 may transmit, by using the PUCCH 609, the HARQ-ACK information corresponding to the deactivation of the SPS PDSCH in a slot succeeding the slot in which the terminal apparatus 1 receives the PDCCH 608 and which is used as a reference, in other words, in Slot #m+$jp_x$+3.

The terminal apparatus 1 may report, to the base station apparatus 3, the HARQ-ACK information corresponding to SPS PDSCH release by using a HARQ-ACK codebook. The terminal apparatus 1 may report, by using the HARQ-ACK codebook, to the base station apparatus 3 the HARQ-ACK information corresponding to the slot indicated by the value of the PDSCH-to-HARQ_feedback timing indicator field included in the DCI format 1_0 or the DCI format 1_1 corresponding to SPS PDSCH release.

The SPS PDSCH release may be performed by the DCI format included in the PDCCH.

In a case that the CRC of the DCI format is scrambled with the CS-RNTI provided by the higher layer parameter cs-RNTI and a new data indicator field of the transport block is set to 0, the terminal apparatus 1 may validate the downlink (DL) SPS assignment PDCCH or the uplink (IL) grant Type2 PDCCH for scheduling activation or scheduling release. The scheduling activation may be performed based at least on the validation and the HARQ process number (HARQ process ID) and redundancy version included in the DCI format. The scheduling release may be performed based at least on the validation and a HARQ process number (HARQ process ID), a redundancy version, a modulation and coding scheme and a resource block assignment that are included in the DCI format. {A mod B} is a modulo operation. The modulo operation is a function that outputs the remainder of the division A/B, and is expressed by {A mod B}. For example, (5 mod 4)=1 may hold.

In a case that downlink data is successfully decoded, an ACK for the downlink data may be generated. In a case that downlink data is not successfully decoded, a NACK for the downlink data may be generated. The HARQ-ACK may include at least a HARQ-ACK bit corresponding at least to one transport block. The HARQ-ACK bit may indicate an ACKnowledgement (ACK) or a Negative-ACKnowledgement (NACK) corresponding to one or multiple transport blocks. The HARQ-ACK may include at least a HARQ-ACK codebook including one or multiple HARQ-ACK bits. The fact that the HARQ-ACK bit corresponds to one or multiple transport blocks may mean that the HARQ-ACK bit corresponds to the PDSCH including the one or multiple transport blocks.

HARQ control corresponding to one transport block may be referred to as a HARQ process. One HARQ process identifier may be provided for each HARQ process. The DCI format may include a field indicating the HARQ process identifier. The HARQ process identifier is also referred to as a HARQ process ID.

For each HARQ process, the New Data Indicator (NDI) may be indicated in the DCI format. For example, the NDI field may be included in the DCI format (DL assignment) including the scheduling information of the PDSCH. The size of the NDI field may be 1 bit. The terminal apparatus 1 may store the value of the NDI for each HARQ process. The base station apparatus 3 may store the value of the NDI for each HARQ process for each terminal apparatus 1. The terminal apparatus 1 may update the value of the NDI stored using the NDI field in the detected DCI format. The base station apparatus 3 may configure, in the NDI field of the DCI format, the updated value of the NDI or the value of the NDI that is not updated and may transmit the DCI format to the terminal apparatus 1. For the HARQ process corresponding to the value of the HARQ process identifier field of the detected DCI format, the terminal apparatus 1 may update the value of the NDI stored using the NDI field of the detected DCI format.

The terminal apparatus 1 may determine whether the received transport block is newly transmitted or retransmitted based on the value of the NDI field of the DCI format (DL assignment). In a case that the value of the NDI field of the detected DCI format is toggled in comparison with the value of the previously received NDI for a transport block of a certain HARQ process, the terminal apparatus 1 may determine the transport block received to have been newly transmitted. In a case of transmitting a transport block for new transmission in a certain HARQ process, the base station apparatus 3 may toggle the value of the NDI stored for the HARQ process and transmit the toggled NDI to the terminal apparatus 1. In a case of transmitting a transport block for retransmission in the certain HARQ process, the base station apparatus 3 need not toggle the value of the NDI stored for the HARQ process and may transmit, to the terminal apparatus 1, the NDI that is not toggled. In a case that the value of the NDI field of the detected DCI format is not toggled (remains the same) in comparison with the value of the previously received NDI for a transport block of a certain HARQ process, the terminal apparatus 1 may determine the transport block received to have been retransmitted. Note that here, "to toggle" means to switch to a different value.

The terminal apparatus 1 may report HARQ-ACK information to the base station apparatus 3 by using the HARQ-ACK codebook in the slot indicated by a value of the HARQ indicator field included in DCI format 1_0 or DCI format 1_1 corresponding to PDSCH reception.

For DCI format 1_0, the value of the HARQ indicator field may be mapped to a set of the number of slots (1, 2, 3, 4, 5, 6, 7, 8). For DCI format 1_1, the value of the HARQ indicator field may be mapped to the set of the number of slots provided by a higher layer parameter dl-DataToUL-ACK. The number of slots indicated based at least on the value of the HARQ indicator field may also be referred to as HARQ-ACK timing or K1. For example, the HARQ-ACK indicating a decoding state of the PDSCH (downlink data) transmitted in the slot n may be reported (transmitted) in the slot n+K1.

dl-DataToUL-ACK indicates a list of timings of the HARQ-ACK for the PDSCH. The timing is the number of slots from the slot in which the HARQ-ACK for the received PDSCH is transmitted, with reference to the slot in which the PDSCH is received (or the slot including the last OFDM symbol to which the PDSCH is mapped). For example, dl-DataToUL-ACK may be a list of one, two, three, four, five, six, seven, or eight timings. In a case that dl-DataToUL-ACK is a list of one timing, the HARQ indicator field is 0 bits. In a case that dl-DataToUL-ACK is a list of two timings, the HARQ indicator field is 1 bit. In a case that dl-DataToUL-ACK is a list of three or four timings, the HARQ indicator field is 2 bits. In a case that dl-DataToUL-ACK is a list of five, six, seven, or eight timings, the HARQ indicator field is 3 bits. In a case that dl-DataToUL-ACK is a list of $n_{K1}$ timings, the HARQ indicator field may be ceil(log2($n_{K1}$)). Here, ceil($X_A$) is a function of outputting an integer to which a number $X_A$ with decimals is rounded up. For example, ceil(2, 3) may be 3. dl-DataToUL-ACK includes a list of timings of any value in the range of from 0 to 31. For example, dl-DataToUL-ACK includes a list of timings of any value in the range from 0 to 63.

The size of dl-DataToUL-ACK is defined as the number of elements included in dl-DataToUL-ACK. The size of dl-DataToUL-ACK may be referred to as $L_{para}$. The index of dl-DataToUL-ACK may indicate the order (number) of the elements of dl-DataToUL-ACK. For example, in a case that the size of dl-DataToUL-ACK is 8 ($L_{para}$=8), the index of dl-DataToUL-ACK may be any value of 1, 2, 3, 4, 5, 6, 7, or 8. The index of dl-DataToUL-ACK may be provided, may be represented, or may be indicated by a value indicated by the HARQ indicator field.

The terminal apparatus 1 may configure the size of the HARQ-ACK codebook according to the size of dl-DataToUL-ACK. For example, in a case that dl-DataToUL-ACK includes eight elements, the size of the HARQ-ACK codebook may be 8. For example, in a case that dl-DataToUL-ACK includes two elements, the size of the HARQ-ACK codebook may be 2. Each of the pieces of HARQ-ACK information constituting the HARQ-ACK codebook may be HARQ-ACK information for PDSCH reception at each slot timing of dl-DataToUL-ACK. This type of HARQ-ACK codebook is also referred to as Semi-static HARQ-ACK codebook.

An example of a configuration of the HARQ indicator field will be described. For example, dl-DataToUL-ACK includes a list of eight timings of 0, 7, 15, 23, 31, 39, 47, and 55 and the HARQ indicator field includes 3 bits. The HARQ indicator field of "000" may correspond to 0 being the first in the list of dl-DataToUL-ACK as a corresponding timing. Specifically, the HARQ indicator field of "000" may correspond to the value 0 indicated by the index 1 of dl-DataToUL-ACK. The HARQ indicator field of "001" may correspond to 7 being the second in the list of dl-DataToUL-ACK as a corresponding timing. The HARQ indicator field of "010" may correspond to 15 being the third in the list of dl-DataToUL-ACK as a corresponding timing. The HARQ indicator field of "011" may correspond to 23 being the fourth in the list of dl-DataToUL-ACK as a corresponding timing. The HARQ indicator field of "100" may correspond to 31 being the fifth in the list of dl-DataToUL-ACK as a corresponding timing. The HARQ indicator field of "101" may correspond to 39 being the sixth in the list of dl-DataToUL-ACK as a corresponding timing. The HARQ indicator field of "110" may correspond to 47 being the seventh in the list of dl-DataToUL-ACK as a corresponding timing. The HARQ indicator field of "111" may correspond to 55 being the eighth in the list of dl-DataToUL-ACK as a corresponding timing. In a case that the received HARQ indicator field indicates "000", the terminal apparatus 1 may transmit a corresponding HARQ-ACK in the 0th slot from the slot of the received PDSCH. In a case that the received HARQ indicator field indicates "001", the terminal apparatus 1 may transmit a corresponding HARQ-ACK in the 7th slot from the slot of the received PDSCH. In a case that the received HARQ indicator field indicates "010", the terminal apparatus 1 may transmit a corresponding HARQ-ACK in the 15th slot from the slot of the received PDSCH. In a case that the received HARQ indicator field indicates "011", the terminal apparatus 1 may transmit a corresponding HARQ-ACK in the 23rd slot from the slot of the received PDSCH. In a case that the received HARQ indicator field indicates "100", the terminal apparatus 1 may transmit a corresponding HARQ-ACK in the 31st slot from the slot of the received PDSCH. In a case that the received HARQ indicator field indicates "101", the terminal apparatus 1 may transmit a corresponding HARQ-ACK in the 39th slot from the slot of the received PDSCH. In a case that the received HARQ indicator field indicates "110", the terminal apparatus 1 may transmit a corresponding HARQ-ACK in the 47th slot from the slot of the received PDSCH. In a case that the received HARQ indicator field indicates "111", the terminal apparatus 1 may transmit a corresponding HARQ-ACK in the 55th slot from the slot of the received PDSCH.

In a case that a higher layer parameter pdsch-AggregationFactor is provided to the terminal apparatus 1, $N_{PDSCH}^{repeat}$ may be a value of the pdsch-AggregationFactor. In a case that the higher layer parameter pdsch-AggregationFactor is not provided to the terminal apparatus 1, $N_{PDSCH}^{repeat}$ may be one. The terminal apparatus 1 may report the HARQ-ACK information for PDSCH reception from the slot n−$N_{PDSCH}^{repeat}$+1 to the slot n using PUCCH transmission and/or PDSCH transmission in the slot n+k. Here, k may be the number of slots indicated by the HARQ indicator field included in the DCI format corresponding to the PDSCH reception. Further, in a case that the HARQ indicator field is not included in the DCI format, k may be provided by the higher layer parameter dl-DataToUL-ACK.

In a case that the terminal apparatus 1 is configured to monitor the PDCCH including DCI format 1_0 and is configured not to monitor the PDCCH including DCI format 1_1, the HARQ-ACK timing value K1 may be some or all of (1, 2, 3, 4, 5, 6, 7, and 8). In a case that the terminal apparatus 1 is configured to monitor the PDCCH including DCI format 1_1, the HARQ-ACK timing value K1 may be provided by a higher layer parameter dl-DataToUL-ACK.

The terminal apparatus 1 may determine a set of multiple occasions for one or more candidate PDSCH receptions for transmission of corresponding HARQ-ACK information on the PUCCH in a certain slot. The terminal apparatus 1 may determine multiple slots at the slot timing K1 included in the dl-DataToUL-ACK to be multiple occasions for candidate PDSCH receptions. K1 may be a set of ks. For example, in a case that dl-DataToUL-ACK is (1, 2, 3, 4, 5, 6, 7, 8), on the PUCCH in a slot n, HARQ-ACK information may be transmitted for a PDSCH reception in a slot n-1, for a PDSCH reception in a slot n-2, for a PDSCH reception in a slot n-3, for a PDSCH reception in a slot n-4, for a PDSCH reception in a slot n-5, for a PDSCH reception in a slot n-6, for a PDSCH reception in a slot n-7, and for a PDSCH reception in a slot n-8. In a case of actually receiving the PDSCH in the slot corresponding to the candidate PDSCH reception, the terminal apparatus 1 may configure the ACK or the NACK as the HARQ-ACK information based on the transport block included in the PDSCH. In a case of receiving no PDSCH in the slot corresponding to the candidate PDSCH reception, the terminal apparatus 1 may configure the NACK as the HARQ-ACK information.

The HARQ indicator field included in the DCI format received on the PDCCH in the slot n-1 may indicate 1. The HARQ indicator field included in the DCI format received on the PDCCH in the slot n-2 may indicate 2. The HARQ indicator field included in the DCI format received on the PDCCH in the slot n-3 may indicate 3. The HARQ indicator field included in the DCI format received on the PDCCH in the slot n-4 may indicate 4. The HARQ indicator field included in the DCI format received on the PDCCH in the slot n-5 may indicate 5. The HARQ indicator field included in the DCI format received on the PDCCH in the slot n-6 may indicate 6. The HARQ indicator field included in the DCI format received on the PDCCH in the slot n-7 may indicate 7. The HARQ indicator field included in the DCI format received on the PDCCH in the slot n-8 may indicate 8.

Based on the slot in which the PDCCH has been received and the value of the HARQ indicator field included in the received DCI format, the terminal apparatus 1 may determine the slot in which the HARQ-ACK information is to be transmitted and a set of slots in which multiple candidate PDSCHs corresponding to the HARQ-ACK information are received. For example, in a case that dl-DataToUL-ACK is (1, 2, 3, 4, 5, 6, 7, 8), it is assumed that the terminal apparatus 1 receives the PDSCH in a slot m and that the HARQ indicator field included in the DCI format included in the PDCCH having scheduled the PDSCH indicates 4. The terminal apparatus 1 may determine that the HARQ-ACK information is transmitted in the slot (m+4). The terminal apparatus 1 may determine the other HARQ-ACK information transmitted in the slot (m+4) to be HARQ-ACK information for the PDSCH reception in the slot (m+(1−4)), HARQ-ACK information for the PDSCH reception in the slot (m+(2−4)), HARQ-ACK information for the PDSCH reception in the slot (m+(3−4)), HARQ-ACK information for the PDSCH reception in the slot (m+(5−4)), HARQ-ACK information for the PDSCH reception in the slot (m+(6−4)), HARQ-ACK information for the PDSCH reception in the slot (m+(7−4)), and HARQ-ACK information for the PDSCH reception in the slot (m+(8−4)).

dl-DataToUL-ACK may include a value (information) indicating that the HARQ-ACK is held, as well as a value indicating the number of slots as a timing for the HARQ-ACK. In a case of receiving, on the PDCCH, the HARQ indicator field indicating the value indicating that the HARQ-ACK is held, the terminal apparatus 1 may hold the HARQ-ACK (HARQ-ACK information) for the PDSCH scheduled by the PDCCH and wait for transmission of the HARQ-ACK (HARQ-ACK information).

The HARQ-ACK codebook described above is of the Semi-static type, however, a different type of HARQ-ACK codebook may be used. A type of HARQ-ACK codebook will be described that is referred to as a Dynamic HARQ-ACK codebook.

The HARQ-ACK codebook corresponding to a certain PDSCH group may be provided based on one or multiple HARQ-ACK bits corresponding to any one of one or multiple transport blocks included in any one of one or multiple PDSCHs included in the certain PDSCH group. The HARQ-ACK codebook may be provided based at least on some or all of a set of monitoring occasions for the PDCCH and the value of a counter DAI field. The HARQ-ACK codebook may be provided further based on the value of the UL DAI field. The HARQ-ACK codebook may be provided further based on the value of the DAI field. The HARQ-ACK codebook may be provided further based on the value of the total DAI field.

The HARQ-ACK codebook size of the Dynamic HARQ-ACK codebook may be based on fields in the DCI format. The size of the HARQ-ACK codebook may be configured based on the value of the counter DAI field in the last received DCI format. The counter DAI field may indicate the cumulative number of PDSCHs or transport blocks scheduled before reception of the corresponding DCI format. The size of the Dynamic HARQ-ACK codebook may be configured based on the value of the total DAI field in the DCI format. The total DAI field may indicate the total number of PDSCHs or transport blocks scheduled before transmission of the HARQ-ACK codebook.

The terminal apparatus 1 may determine a set of monitoring occasions for the PDCCH for the HARQ-ACK information transmitted on the PUCCH mapped to the slot having index n (slot #n), based at least on some or all of a value of a timing K1 and a value of a slot offset K0. The set of monitoring occasions for the PDCCH for the HARQ-ACK information transmitted on the PUCCH mapped to the slot having index n is also referred to as a set of monitoring occasions for the PDCCH for the slot n (monitoring occasion for PDCCH for slot #n). Here, the set of monitoring occasions for the PDCCH may include M monitoring occasions for the PDCCH. For example, the slot offset K0 may be indicated based at least on a value of the time domain resource allocation field included in a downlink DCI format. The slot offset K0 may be a value indicating the number of slots (difference of slots) from a slot including the last OFDM symbol to which the PDCCH including a DCI format including the time domain resource allocation field indicating the slot offset K0 is mapped to the first OFDM symbol of the PDSCH scheduled by the DCI format.

In a case that the DCI format detected in any one monitoring occasion for the search space set corresponding to a certain monitoring occasion for the PDCCH triggers transmission of the HARQ-ACK information in the slot n, the terminal apparatus 1 may determine the monitoring occasion for the PDCCH as the PDCCH monitoring occasion for the slot n. In a case that the DCI format detected in the monitoring occasion for the search space set corresponding to a certain monitoring occasion for the PDCCH does not trigger transmission of the HARQ-ACK information in the slot n, the terminal apparatus 1 need not determine the monitoring occasion for the PDCCH as the PDCCH monitoring occasion for the slot n. In a case that the DCI format is not detected in the monitoring occasion for the search space set corresponding to a certain monitoring occasion for the PDCCH, the terminal apparatus 1 need not determine the monitoring occasion for the PDCCH as the PDCCH monitoring occasion for the slot n.

The PUCCH resource used for transmission of the HARQ-ACK information in the slot n may be identified based at least on the PUCCH resource indicator field that is included in the last DCI format among one or multiple DCI formats detected in the set of monitoring occasions for the PDCCH for the slot n. Here, each of the one or multiple DCI formats triggers transmission of the HARQ-ACK information in the slot n. The last DCI format may be a DCI format corresponding to the last index (largest index) among the DCI formats detected in the set of monitoring occasions for the PDCCH for the slot n. The index of the DCI format in the set of monitoring occasions for the PDCCH for the slot n is given in ascending order for the index of the serving cell in which the DCI format is detected and is then given in ascending order for the index of the monitoring occasion for the PDCCH in which the DCI format is detected. The index of the monitoring occasion for the PDCCH is given in ascending order on the time axis.

In the M monitoring occasions for the PDCCH, for a certain monitoring occasion for the PDCCH in a certain serving cell, a Counter DAI may indicate the cumulative number of the PDCCHs detected before the monitoring occasion for the PDCCH in the serving cell (the cumulative number may alternatively be a value at least related to the cumulative number). The counter DAI may also be referred to as a C-DAI. The C-DAI corresponding to the PDSCH may be indicated by the field included in the DCI format used for scheduling of the PDSCH. The total DAI may indicate a cumulative number of the PDCCHs detected before the monitoring occasion m for the PDCCH in the M monitoring occasions for the PDCCH (the cumulatively number may alternatively be a value at least related to the cumulative number). The total DAI may indicate the cumulative number of the PDSCHs detected before the monitoring occasion m for the PDCCH in the M monitoring occasions for the PDCCH (the cumulative number may alternatively be a value at least related to the cumulative number). The total DAI may be referred to as a Total Downlink Assignment Index (T-DAI).

The Semi-static HARQ-ACK codebook (Type-1 HARQ-ACK codebook) or the Dynamic HARQ-ACK codebook (Type-2 HARQ-ACK codebook) may be HARQ-ACK codebook for which transmission is indicated (triggered or requested) based on the DL assignment. The DCI format including the HARQ indicator field may be a Downlink (DL) assignment. The DL assignment may be a DCI format used for scheduling of the PDSCH. The DL assignment may be a DCI format used for allocation of the PDSCH. The Semi-static HARQ-ACK codebook may be configured based on the dl-DataToUL-ACK and the HARQ indicator field. The size of the Semi-static HARQ-ACK codebook may be given based on the size included in the dl-DataToUL-ACK. The timing of the slot included in the Semi-static HARQ-ACK codebook or the Dynamic HARQ-ACK codebook may be given based on the value of the HARQ indicator field and the slot in which DCI including the HARQ indicator field has been received.

The Type-3 HARQ-ACK codebook may be a HARQ-ACK codebook for which the transmission is triggered by a DCI format with the scheduling information (DL assignment) of the PDSCH. The Type-3 HARQ-ACK codebook may be a HARQ-ACK codebook for which the transmission is triggered by a DCI format with no scheduling information of the PDSCH.

The transmission of the Type-3 HARQ-ACK codebook may be indicated (triggered or requested) by a DCI format corresponding to a DL assignment. The DCI format may include a dedicated field that indicates (triggers, requests) the transmission of the Type-3 HARQ-ACK codebook.

For the Type-3 HARQ-ACK codebook, a HARQ trigger bit refers to a bit included in the DCI format and that triggers transmission of HARQ-ACK information included in some or all of the HARQ processes.

In a case that the higher layer parameter pdsch-HARQ-ACK-OneShotFeedback-r16 is provided to the terminal apparatus 1 and that the base station apparatus 3 indicates (requests), by using the HARQ trigger bit, that the terminal apparatus 1 transmit (report) the Type-3 HARQ-ACK codebook, the terminal apparatus 1 may transmit (report), to the base station apparatus 3 by using the Type-3 HARQ-ACK codebook, the HARQ-ACK information included in some or all of the HARQ processes configured for the terminal apparatus 1 and the value of the NDI included in some or all of the HARQ processes configured for the terminal apparatus 1. In a case that the higher layer parameter pdsch-HARQ-ACK-OneShotfeedback-r16 is provided to the terminal apparatus 1 and that the base station apparatus 3 indicates (requests), by using the HARQ trigger bit, that the terminal apparatus 1 transmit (report) the Type-3 HARQ-ACK codebook, the terminal apparatus 1 may transmit (report), to the base station apparatus 3 for one HARQ process, one piece of HARQ-ACK information included in the HARQ process and the value of one NDI included in the HARQ process.

In a case that the higher layer parameter pdsch-HARQ-ACK-OneShotFeedback-r16 is not provided to the terminal apparatus 1 and that the base station apparatus 3 indicates (requests), by using the HARQ trigger bit, that the terminal apparatus 1 transmit (report) the Type-3 HARQ-ACK codebook, the terminal apparatus 1 may transmit (report), to the base station apparatus 3 by using the Type-3 HARQ-ACK codebook, HARQ-ACK information included in some or all of the HARQ processes configured for the terminal apparatus 1. In a case that the higher layer parameter pdsch-HARQ-ACK-OneShotFeedback-r16 is not provided to the terminal apparatus 1 and that the base station apparatus 3 indicates (requests), by using the HARQ trigger bit, that the terminal apparatus 1 transmit (report) the Type-3 HARQ-ACK codebook, the terminal apparatus 1 may transmit (report), to the base station apparatus 3 for one HARQ process, one piece of HARQ-ACK information included in the HARQ process.

Providing the higher layer parameter pdsch-HARQ-ACK-OneShotFeedback-r16 to the terminal apparatus 1 may mean that the higher layer parameter pdsch-HARQ-ACK-OneShotFeedback-r16 is configured with the value of enable.

The Type-3 HARQ-ACK codebook may include HARQ-ACK information for some or all of the HARQ processes. For example, the HARQ process may mean a HARQ process used for the PDSCH. For example, all of the HARQ processes may mean all of the HARQ processes that may be used in at least one Serving cell. For example, the number of HARQ processes that may be used in one Serving cell may be 16. For example, the number of HARQ processes that may be used in five Serving cells may be 80. For example, the multiple HARQ processes may mean multiple HARQ processes configured by RRC signalling. For example, the multiple HARQ processes may mean multiple HARQ processes indicated by the Downlink control information. For example, the multiple HARQ processes may mean multiple HARQ processes explicitly or implicitly indicated. For example, the number of the multiple HARQ processes may be eight. For example, the number of the multiple HARQ processes may be 10.

The Type-3 HARQ-ACK codebook may be a HARQ-ACK codebook that defines the HARQ process for the PDSCH to which the HARQ-ACK included in the HARQ-ACK codebook corresponds. The slot in which the PDSCH is received, to which the HARQ-ACK included in the Type-3 HARQ-ACK codebook corresponds, is not limited in advance and may be configured by scheduling performed by the base station apparatus 3.

The Type-3 HARQ-ACK codebook may include the value of the NDI linked with the HARQ process corresponding to the HARQ-ACK reported in the Type-3 HARQ-ACK codebook. The Type-3 HARQ-ACK codebook may include the value of the NDI for each HARQ process including HARQ-ACK information reported in the Type-3 HARQ-ACK codebook. The terminal apparatus 1 may determine (configure) the HARQ-ACK information to be included in the Type-3 HARQ-ACK codebook based at least on some or all of the HARQ processes and the value of the NDI which are stored.

The HARQ-ACK may be HARQ-ACK information corresponding to a transport block for a certain HARQ process. The value of the NUI may indicate an NDI for the certain HARQ process. The value of the NDI may indicate an NDI corresponding to the HARQ-ACK information.

In a case that the higher layer parameter pdsch-HARQ-ACK-OneShotFeedback-r16 is provided to the terminal apparatus 1 and that the terminal apparatus 1 receives the PDCCH including the DCI format with the HARQ trigger bit set to 1 and that the terminal apparatus 1 is not configured with the SPS PDSCH, the terminal apparatus 1 may transmit, by using the PUCCH, the HARQ-ACK information included in the HARQ process configured for the terminal apparatus 1, the value of the NDI included in the HARQ process, and the HARQ-ACK information corresponding to the PDSCH scheduled by the PDCCH.

In a case that the higher layer parameter pdsch-HARQ-ACK-OneShotFeedback-r16 is provided to the terminal apparatus 1 and that the terminal apparatus 1 receives the PDCCH including the DCI format with the HARQ trigger bit set to 1 and that the terminal apparatus 1 is not configured with the SPS PDSCH, the terminal apparatus 1 may transmit, by using the PUCCH, the HARQ-ACK information included in the HARQ process configured for the terminal apparatus 1, the value of the NDI included in the HARQ process, and the HARQ-ACK information corresponding to the PDSCH scheduled by the PDCCH.

Receiving, by the terminal apparatus 1, the PDCCH including the format with the HARQ trigger bit set to 1 may mean indicating (requesting), by the base station apparatus 3, that the terminal apparatus 1 transmit (report) the Type-3 HARQ-ACK codebook. The HARQ trigger bit being set to 1 may mean indicating (requesting) transmission (report) of the Type-3 HARQ-ACK codebook.

In a case that the terminal apparatus 1 receives multiple PDSCHs and is indicated, by the base station apparatus 3, transmission (report) of the HARQ-ACK information corresponding to the multiple PDSCHs by using the PUCCH in a certain slot and that the multiple DCI formats included in the multiple PDCCHs scheduling the multiple PDSCHs include no DCI format set to trigger the Type-3 HARQ-ACK codebook, the terminal apparatus 1 may determine a PUCCH by using a parameter related to the report of the HARQ-ACK information included in the last received DCI format of the DCI formats included in the multiple PDCCHs scheduling the multiple PDSCHs, generate a Type-1 HARQ-ACK codebook or a Type-2 HARQ-ACK codebook, and then transmit the Type-1 HARQ-ACK codebook or the Type-2 HARQ-ACK codebook by using the PUCCH determined. The parameters may be ignored that are related to the report of the HARQ-ACK information included in the DCI formats other than the last received DCI format. Here, the parameter related to the report of the HARQ-ACK information may be a parameter for determining a PUCCH resource. The parameter related to the report of the HARQ-ACK information may be the PRI.

In a case that the terminal apparatus 1 receives multiple PDSCHs and is indicated, by the base station apparatus 3, transmission (report) of the HARQ-ACK information corresponding to the multiple PDSCHs by using the PUCCH in a certain slot and that the multiple DCI formats included in the multiple PDCCHs scheduling the multiple PDSCHs include at least one DCI format set to trigger the Type-3 HARQ-ACK codebook, the terminal apparatus 1 may determine a PUCCH by using a parameter related to the report of the HARQ-ACK information included in the DCI format triggering the Type-3 HARQ-ACK codebook and ignore the parameters related to the report of the HARQ-ACK information included in the DCI formats other than the DCI format triggering the Type-3 HARQ-ACK codebook. Here, the parameter related to the report of the HARQ-ACK information may be a parameter for determining a PUCCH resource. The parameter related to the report of the HARQ-ACK information may be the PRI.

In a case that the terminal apparatus 1 receives multiple PDSCHs and is indicated, by the base station apparatus 3, transmission (report) of the HARQ-ACK information corresponding to the multiple PDSCHs by using the PUCCH in a certain slot and that the multiple DCI formats included in the multiple PDCCHs scheduling the multiple PDSCHs include no DCI format set to trigger the Type-3 HARQ-ACK codebook, the terminal apparatus 1 may generate a Type-1 HARQ-ACK codebook or a Type-2 HARQ-ACK codebook. The terminal apparatus 1 may include, in the Type-1 HARQ-ACK codebook or the Type-2 HARQ-ACK codebook, a part or all of the HARQ-ACK information reported in the certain slot.

In a case that the terminal apparatus 1 receives multiple PDSCHs and is indicated, by the base station apparatus 3, transmission (report) of the HARQ-ACK information corresponding to the multiple PDSCHs by using the PUCCH in a certain slot and that the multiple DCI formats included in the multiple PDCCHs scheduling the multiple PDSCHs include no DCI format set to trigger the Type-3 HARQ-ACK codebook, the terminal apparatus 1 may generate a codebook configured by the higher layer parameter pdsch-HARQ-ACK-codebook. The terminal apparatus 1 may include, in the codebook configured by the higher layer parameter pdsch-HARQ-ACK-codebook, a part or all of the HARQ-ACK information reported in the certain slot. The codebook configured by the higher layer parameter pdsch-HARQ-ACK-codebook may be the Type-1 HARQ-ACK codebook or the Type-2 HARQ-ACK codebook.

In a case that the terminal apparatus 1 receives multiple PDSCHs and is indicated, by the base station apparatus 3, transmission (report) of the HARQ-ACK information corresponding to the multiple PDSCHs by using the PUCCH in a certain slot and that the multiple DCI formats included in the multiple PDCCHs scheduling the multiple PDSCHs include at least one DCI format set to trigger the Type-3 HARQ-ACK codebook, the terminal apparatus 1 may generate a Type-3 HARQ-ACK codebook. The terminal apparatus 1 may include a part or all of the HARQ-ACK information reported in the certain slot in the Type-3 HARQ-ACK codebook.

FIG. 6 is a diagram illustrating an example of a method for selecting a HARQ-ACK codebook according to the present embodiment. The dl-DataToUL-ACK indicated by 600 is 6, 5, and 4. It is assumed that a PDCCH 601 schedules a PDSCH 604, a PDCCH 602 schedules a PDSCH 605, and a PDCCH 603 schedules a PDSCH 606. In the DCI format included in the PDCCH 601, the PDSCH-to-HARQ feedback timing indicator field (HARQ Timing) has a value of 0, in the DCI format included in a PDCCH 702, the PDSCH-to-HARQ feedback timing indicator field (HARQ Timing) has a value of 1, and in the DCI format included in a PDCCH 703, the PDSCH-to-HARQ feedback timing indicator (HARQ Timing) field has a value of 2. HARQ Timing may be referred to as the PDSCH-to-HARQ feedback timing indicator. The HARQ Timing field may be referred to as the PDSCH-to-HARQ feedback timing indicator field. Based at least on the value of the PDSCH-to-HARQ feedback timing indicator (HARQ Timing) field, the terminal apparatus 1 may determine a slot in which the PUCCH including the HARQ-ACK information corresponding to the PDSCH is transmitted. In other words, the HARQ-ACK information corresponding to the PDSCH 604, the HARQ-ACK information corresponding to the PDSCH 605, and the HARQ-ACK information corresponding to the PDSCH 606 may be transmitted (reported) in a slot m+6.

In a case that none of the DCI format included in the PDCCH 601, the DCI format included in the PDCCH, 602, and the DCI format included in the PDCCH 603 is set to trigger the Type-3 HARQ-ACK codebook, the terminal apparatus 1 may generate a codebook configured by the higher layer parameter pdsch-HARQ-ACK-codebook. Here, the terminal apparatus 1 may transmit the generated codebook by using a PUCCH 607 determined based on the parameter related to the report of the HARQ-ACK information included in the DCI format included in the PDCCH 603.

In a case that one of the DCI format included in the PDCCH 601, the DCI format included in the PDCCH 602, and the DCI format included in the PDCCH 603 is set to trigger the Type-3 HARQ-ACK codebook, the terminal apparatus 1 may generate a Type-3 HARQ-ACK codebook. For example, in a case that the HARQ trigger bit is configured to 1 in the DCI format included in the PDCCH 602 and that the DCI format included in the PDCCH 601 and the DCI format included in the PDCCH 603 are not set to trigger the Type-3 HARQ-ACK codebook, the terminal apparatus 1 may transmit the generated Type-3 HARQ-ACK codebook by using the PUCCH 607 determined based on the parameter related to the report of the HARQ-ACK information included in the DCI format included in the PDCCH 602.

The fact that the terminal apparatus 1 is configured with the SPS PDSCH may mean that the SPS PDSCH is activated in the terminal apparatus 1. The fact that the terminal apparatus 1 is configured with the SPS PDSCH may mean that the terminal apparatus 1 is provided with the configuration of the SPS PDSCH.

The fact that the terminal apparatus 1 is not configured with the SPS PDSCH may mean that the SPS PDSCH is deactivated in the terminal apparatus 1. The fact that the terminal apparatus 1 is not configured with the SPS PDSCH may mean that the terminal apparatus 1 is not provided with configuration of the SPS PDSCH.

The terminal apparatus 1 receiving the SPS PDSCH may mean the terminal apparatus 1 being configured with the SPS PDSCH.

Figure 7:
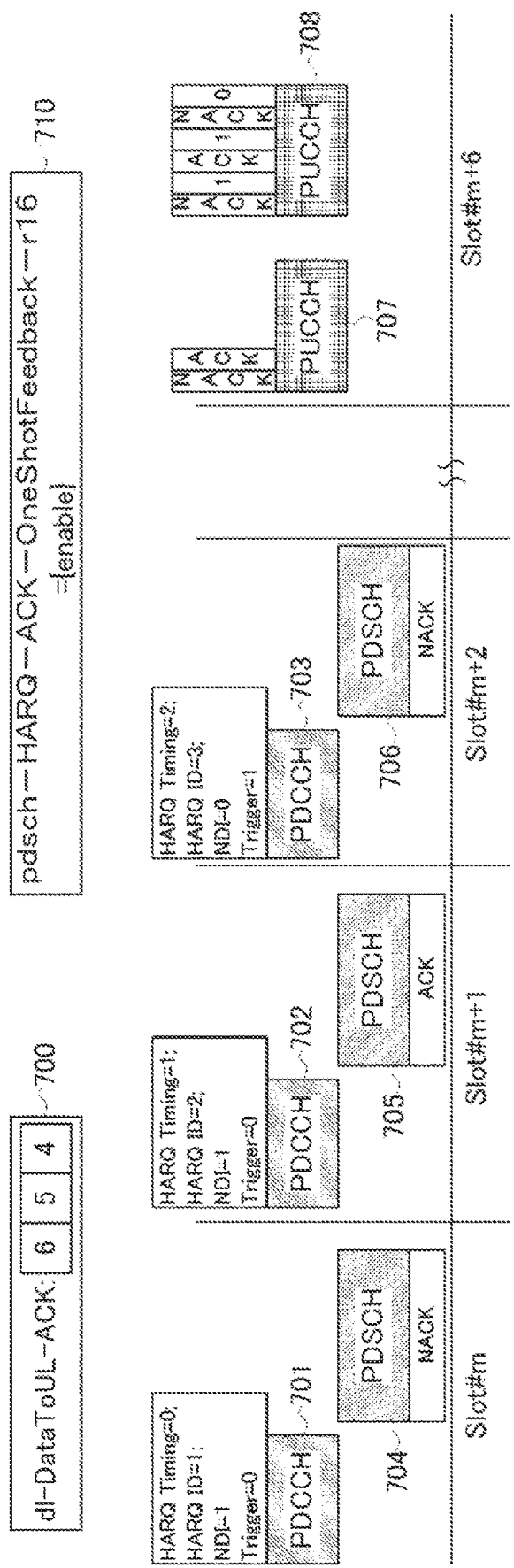
FIG. 7 is a diagram illustrating an example of a Type-3 HARQ-ACK codebook in a case that no SPS PDSCH is configured according to the present embodiment.

FIG. 7 is a diagram illustrating an example of the Type-3 HARQ-ACK codebook in a case that the SPS PDSCH is not configured according to the present embodiment. The dl-DataToUL-ACK indicated by 700 is 6, 5, and 4. It is assumed that a PDCCH 701 schedules a PDSCH 704, the PDCCH 702 schedules a PDSCH 705, and the PDCCH 703 schedules a PDSCH 706. In the DCI format included in the PDCCH 701, the PDSCH-to-HARQ feedback timing indicator field (HARQ Timing) has a value of 0, the HARQ process ID is 1, the NDI is 1, and the HARQ trigger bit is 0. In the DCI format included in the PDCCH 702, the PDSCH-to-HARQ feedback timing indicator field (HARQ Timing) has a value of 1, the HARQ process ID is 2, the NDI is 1, and the HARQ trigger bit is 0. In the DCI format included in the PDCCH 703, the PDSCH-to-HARQ feedback timing indicator (HARQ Timing) field has a value of 2, the HARQ process ID is 3, the NDI is 0, and the HARQ trigger bit is 1. HARQ Timing may be referred to as the PDSCH-to-HARQ_feedback timing indicator. The HARQ Timing field may be referred to as the PDSCH-to-HARQ_feedback timing indicator field.

The HARQ-ACK information corresponding to the PDSCH 704 is assumed to be a NACK. The HARQ-ACK information corresponding to the PDSCH 705 is assumed to be an ACK. Based at least on the value of the PDSCH-to-HARQ feedback timing indicator (HARQ Timing) field in the format included in the PDCCH 701, the terminal apparatus 1 may determine a slot in which the PUCCH including the HARQ-ACK information corresponding to the PDSCH 704 is transmitted. Based on the value of the PDSCH-to-HARQ feedback timing indicator (HARQ Timing) field in the DCI format included in the PDCCH 702, the terminal apparatus 1 may determine a slot in which the PUCCH including the HARQ-ACK information corresponding to the PDSCH 705 is transmitted. For example, in FIG. 7, the PDSCH-to-HARQ feedback timing indicator (HARQ Timing) field in the DCI format included in the PDCCH 701 has a value of 0, and among one or multiple values of the dl-DataToUL-ACK of the higher layer parameter 700, 6, that is, the value of index 0 corresponding to the value of the HARQ Timing, corresponds to K1 (the number of slots from the PDSCH to the HARQ feedback), and thus the terminal apparatus 1 may transmit the HARQ-ACK information corresponding to the PDSCH 704 in the slot Slot #m+6 corresponding to six slots after the PDSCH 704, the HARQ-ACK information being included in the PUCCH. For example, in FIG. 7, the PDSCH-to-HARQ feedback timing indicator (HARQ Timing) field in the DCI format included in the PDCCH 702 has a value of 1, and among one or multiple values of the dl-DataToUL-ACK of the higher layer parameter 700, 5, that is, the value of index 1 corresponding to the value of the HARQ corresponds to the PDSCH-to-HARQ feedback timing, and thus the terminal apparatus 1 may transmit the HARQ-ACK information corresponding to the PDSCH 705 in the slot Slot #m+6 corresponding to five slots after the PDSCH 705, the HARQ-ACK information being included in the PUCCH. In a case that the PRI of the DCI format included in the PDCCH 701 and the PRI of the DCI format included in the PDCCH 702 indicate a PUCCH 707, the terminal apparatus 1 may include, in the Type-1 HARQ-ACK codebook or the Type-2 HARQ-ACK codebook, the HARQ-ACK information corresponding to the PDSCH 704 and the HARQ-ACK information corresponding to the PDSCH 705 and may transmit the Type-1 HARQ-ACK codebook or the Type-2 HARQ-ACK codebook by using the PUCCH 707.

The HARQ-ACK information corresponding to the PDSCH 706 is assumed to be a NACK. Based on the value of the HARQ feedback timing indicator field in the DCI format included in the PDCCH 703, the terminal apparatus 1 transmits, on the PUCCH 708, the HARQ-ACK information corresponding to the PDSCH 706. Here, the HARQ trigger bit in the DCI format included in the PDCCH 703 is 1, and thus in a case that the pdsch-HARQ-ACK-OneShot-Feedback-r16 of a higher layer parameter 710 is provided to the terminal apparatus 1, the terminal apparatus 1 includes, in the Type-3 HARQ-ACK codebook, the HARQ-ACK information included in some or all of the HARQ processes configured for the terminal apparatus 1 and the value of the NDI included in the some or all of the HARQ processes and transmits the Type-3 HARQ-ACK codebook on a PUCCH 708. In other words, the HARQ trigger bit in the DCI format included in the PDCCH 703 is 1, and thus the terminal apparatus 1 includes, in the Type-3 HARQ-ACK codebook, the HARQ-ACK information included in a HARQ process ID1, a HARQ process ID2, and a HARQ process ID3 configured for the terminal apparatus 1, and the values of NDI included in the HARQ process ID1, the HARQ process ID2, and the HARQ process ID3 configured for the terminal apparatus 1, and transmits the Type-3 HARQ-ACK codebook on the PUCCH 708. The HARQ trigger bit in the DCI format included in the PDCCH 703 is 1, and thus in a case that the pdsch-HARQ-ACK-OneShotFeedback-r16 of the higher layer parameter 710 is not provided to the terminal apparatus 1, the terminal apparatus 1 includes, in the Type-3 HARQ-ACK codebook, the HARQ-ACK information included in some or all of the HARQ processes configured for the terminal apparatus 1 and transmits the Type-3 HARQ-ACK codebook on the PUCCH 708. In other words, the HARQ trigger bit in the DCI format included in the PDCCH 703 is 1, and thus the terminal apparatus 1 includes, in the Type-3 HARQ-ACK codebook, the HARQ-ACK information included in the HARQ process ID1, the HARQ process ID2, and the HARQ process ID3 configured for the terminal apparatus 1, and transmits the Type-3 HARQ-ACK codebook on the PUCCH 708.

In a case that a first PUCCH including the Type-3 HARQ-ACK codebook and a second PUCCH including the Type-1 HARQ-ACK codebook or the Type-2 HARQ-ACK codebook exist in one slot, the terminal apparatus 1 need not transmit the second PUCCH and may exclusively transmit the first PUCCH. For example, in FIG. 7, the terminal apparatus 1 may transmit the PUCCH 708 including the Type-3 HARQ-ACK codebook and need not transmit the PUCCH 707 including the Type-1 HARQ-ACK codebook or the Type-2 HARQ-ACK codebook.

The HARQ-ACK information and the value of the NDI transmitted on the PUCCH 708 may be allocated at the first bit (Most Significant Bit (MSB)) of the bit string based on the HARQ-ACK information and the value of the NDI included in a HARQ process with a small HARQ process ID. The HARQ-ACK information and the value of the NDI transmitted on the PUCCH 708 may be allocated at the first bit (Most Significant Bit (MSB)) of the bit string based on the HARQ-ACK information and the value of the NDI included in a HARQ process with a large HARQ process ID. The HARQ-ACK information and the value of the NDI transmitted on the PUCCH 708 may be allocated at the first bit (Most Significant Bit (MSB)) of the bit string based on the HARQ-ACK information and the value of the NDI included in a previously allocated HARQ process.

In a case that the higher layer parameter pdsch-HARQ-ACK-OneShotFeedback-r16 is provided to the terminal apparatus 1, the size of the Type-3 HARQ-ACK codebook may be given based at least on a part or all of the number of HARQ processes configured for the terminal apparatus 1 and the PDCCH deactivating the SPS PDSCH. For example, in a case that the higher layer parameter pdsch-HARQ-ACK-OneShotFeedback-r16 is provided to the terminal apparatus 1 and that the number of the HARQ processes configured for the terminal apparatus 1 is 16 and that the terminal apparatus 1 has not received the PDCCH deactivating the SPS PDSCH, the size of the Type-3 HARQ-ACK codebook may be the sum (32 bits) of the number of the pieces of HARQ-ACK information included in the HARQ processes (16 bits) and the number of the latest NDIs for each HARQ process (16 bits). The number of the latest NDIs for one HARQ process may be two. For example, in a case that the higher layer parameter pdsch-HARQ-ACK-OneShotFeedback-r16 is provided to the terminal apparatus 1 and that the number of the HARQ processes configured for the terminal apparatus 1 is 16 and that the terminal apparatus 1 has received the PDCCH deactivating the SPS PDSCH, the size of the Type-3 HARQ-ACK codebook may be the sum (33 bits) of the number of the pieces of HARQ-ACK information included in the HARQ processes (16 bits), the number of the latest NDIs for each HARQ process (16 bits), and the HARQ-ACK information corresponding to the deactivation of the SPS PDSCH (1 bit). For example, in a case that the higher layer parameter pdsch-HARQ-ACK-OneShotFeedback-r16 is provided to the terminal apparatus 1 and that the number of the HARQ processes configured for the terminal apparatus 1 is 16 and that the terminal apparatus 1 has received the PDCCH deactivating the SPS PDSCH, the size of the Type-3 HARQ-ACK codebook may be the sum (33 bits) of the number of the pieces of HARQ-ACK information included in the HARQ processes (16 bits), the number of the latest NDIs for each HARQ process (16 bits), the HARQ-ACK information corresponding to the deactivation of the SPS PDSCH (1 bit), and a prescribed value corresponding to the NDI (1 bit). Here, the "prescribed value corresponding to the NDI" may be a value that does not function as an NDI due to the lack of a value of the NDI for the SPS PDSCH but that is used to be configured in the NDI field included in the Type-3 HARQ-ACK codebook (placeholder value). The prescribed value corresponding to the NDI may be 0, or may be 1.

In a case that the higher layer parameter pdsch-HARQ-ACK-OneShotFeedback-r16 is not provided to the terminal apparatus 1, the size of the Type-3 HARQ-ACK codebook may be given based at least on a part or all of the number of HARQ processes configured for the terminal apparatus 1 and the PDCCH deactivating the SPS PDSCH. For example, in a case that the higher layer parameter pdsch-HARQ-ACK-OneShotFeedback-r16 is not provided to the terminal apparatus 1 and that the number of HARQ processes configured for the terminal apparatus 1 is 16 and that the terminal apparatus 1 has not received the PDCCH deactivating the SPS PDSCH, the size of the Type-3 HARQ-ACK codebook may be the number of the pieces of HARQ-ACK information included in the HARQ processes (16 bits). For example, in a case that the higher layer parameter pdsch-HARQ-ACK-OneShotFeedback-r16 is not provided to the terminal apparatus 1 and that the number of HARQ processes configured for the terminal apparatus 1 is 16 and that the terminal apparatus 1 has received the PDCCH deactivating the SPS PDSCH, the size of the Type-3 HARQ-ACK codebook may be the sum (17 bits) of the number of the pieces of HARQ-ACK information included in the HARQ processes (16 bits) and the HARQ-ACK information corresponding to the deactivation of the SPS PDSCH (1 bit).

Triggering the report (transmission) of the HARQ-ACK information included in one or multiple HARQ processes configured for the terminal apparatus 1 may mean triggering the report (transmission) of the Type-3 HARQ-ACK codebook.

Figure 8:
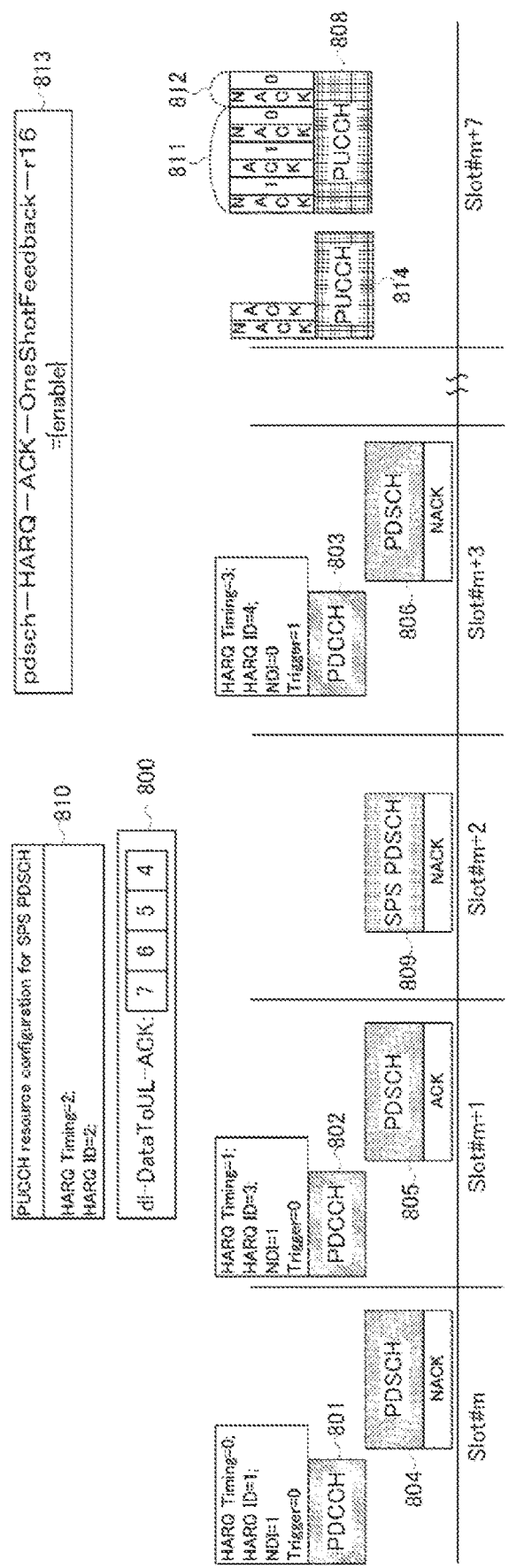
FIG. 8 is a diagram illustrating an example of a report of HARQ-ACK information corresponding to the PDSCH and the SPS PDSCH scheduled by a DL grant in a case that the SPS PDSCH is configured for the terminal apparatus 1 according to the present embodiment.

FIG. 8 is a diagram illustrating an example of report of HARQ-ACK information corresponding to the PDSCH and the SPS PDSCH scheduled by a DL grant in a case that the SPS PDSCH is configured for the terminal apparatus 1 according to the present embodiment. It is assumed that a PDCCH 801 schedules a PDSCH 804, a PDCCH 802 schedules a PDSCH 805, and a PDCCH 803 schedules a PDSCH 806. In the DCI format included in the PDCCH 801, the PDSCH-to-HARQ feedback timing indicator field (HARQ Timing) has a value of 0, the HARQ process ID is 1, the NDI is 1, and the HARQ trigger bit is 0. In the DCI format included in the PDCCH 802, the PDSCH-to-HARQ feedback timing indicator field (HARQ Timing) has a value of 1, the HARQ process ID is 3, the NDI is 1, and the HARQ trigger bit is 0. In the DCI format included in the PDCCH 803, the PDSCH-to-HARQ feedback timing indicator (HARQ Timing) field has a value of 3, the HARQ process ID is 4, the NDI is 0, and the HARQ trigger bit is 1. HARQ Timing may be referred to as the PDSCH-to-HARQ_feedback timing indicator. The HARQ Timing field may be referred to as the PDSCH-to-HARQ_feedback timing indicator field.

The HARQ-ACK information corresponding to the PDSCH 804 is assumed to be a NACK. The HARQ-ACK information corresponding to the PDSCH 805 is assumed to be an ACK. Based at least on the value of the PDSCH-to-HARQ feedback timing indicator (HARQ Timing) field in the DCI format included in the PDCCH 801, the terminal apparatus 1 may determine a slot in which the PUCCH including the HARQ-ACK information corresponding to the PDSCH 804 is transmitted. Based on the value of the PDSCH-to-HARQ feedback timing indicator (HARQ Timing) field in the DCI format included in the PDCCH 802, the terminal apparatus 1 may determine a slot in which the PUCCH including the HARQ-ACK information corresponding to the PDSCH 805 is transmitted. Based on the value of the PDSCH-to-HARQ feedback timing indicator (HARQ Timing) field included in a configuration 810 related to the report of HARQ-ACK information corresponding to an SPS PDSCH 809, the terminal apparatus 1 may determine a slot in which the PUCCH including the HARQ-ACK information corresponding to the SPS PDSCH 809 is transmitted. For example, in FIG. 8, the PDSCH-to-HARQ feedback timing indicator (HARQ Timing) field in the DCI format included in the PDCCH 801 has a value of 0, and among one or multiple values of the dl-DataToUL-ACK of the higher layer parameter 800, 7, that is, the value of index 0 corresponding to the value of the HARQ Timing, corresponds to K1 (the number of slots from the PDSCH to the HARQ feedback), and thus the terminal apparatus 1 may transmit the HARQ-ACK information corresponding to the PDSCH 804 in the slot Slot #m+7 corresponding to seven slots after the PDSCH 804, the HARQ-ACK information being included in the PUCCH. For example, in FIG. 8, the PDSCH-to-HARQ feedback timing indicator (HARQ Timing) field in the DCI format included in the PDCCH 802 has a value of 1, and among one or multiple values of the dl-DataToUL-ACK of the higher layer parameter 800, 6, that is, the value of index 1 corresponding to the value of the HARQ Timing, corresponds to K1 (the number of slots from the PDSCH to the HARQ feedback), and thus the terminal apparatus 1 may transmit the HARQ-ACK information corresponding to the PDSCH 805 in the slot Slot #m+7 corresponding to six slots after the PDSCH 805, the HARQ-ACK information being included in the PUCCH. For example, in FIG. 8, the PDSCH-to-HARQ feedback timing indicator (HARQ Timing) field included in the configuration 810 has a value of 2, the configuration 810 being related to the report of the HARQ-ACK information corresponding to the SPS PDSCH 809, and among one or multiple values of the dl-DataToUL-ACK of the higher layer parameter 800, 5, that is, the value of index 2 corresponding to the value of the HARQ Timing, corresponds to K1 (the number of slots from the PDSCH to the HARQ feedback), and thus the terminal apparatus 1 may transmit the HARQ-ACK information corresponding to the SPS PDSCH 805 in the slot Slot #m+7 corresponding to five slots after the SPS PDSCH 809, the HARQ-ACK information being included in the PUCCH. In a case where the PRI of the DCI format included in the PDCCH 801, the PRI of the DCI format included in the PDCCH 802 and the PRI included in the configuration related to the report of the HARQ-ACK information corresponding to the SPS PDSCH 809 indicate the PUCCH 814, the terminal apparatus 1 may include, in the Type-1 HARQ-ACK codebook or Type-2 HARQ-ACK codebook, the HARQ-ACK information corresponding to the PDSCH 804, the HARQ-ACK information corresponding to the PDSCH 805, the HARQ-ACK information corresponding to the SPS PDSCH 809, and may transmit the Type-1 HARQ-ACK codebook or Type-2 HARQ-ACK codebook by using the PUCCH 814.

In a case that a first PUCCH including the Type-3 HARQ-ACK codebook and a second PUCCH including the Type-1 HARQ-ACK codebook or the Type-2 HARQ-ACK codebook exist in one slot, the terminal apparatus 1 need not transmit the second PUCCH and may exclusively transmit the first PUCCH. For example, in FIG. 8, the terminal apparatus 1 may transmit a PUCCH 808 including Type-3 HARQ-ACK codebook and need not transmit PUCCH 814 including the Type-1 HARQ-ACK codebook, or the Type-2 HARQ-ACK codebook.

In a case that the pdsch-HARQ-ACK-OneShotfeedback-r16 of a higher layer parameter 813 is provided to the terminal apparatus 1 and that the HARQ trigger bit included in the DCI format included in the PDCCH 803 is 1 and that the PRI included in the DCI format indicates the PUCCH 808, the terminal apparatus 1 may include, in the Type-3 HARQ-ACK codebook, the HARQ-ACK information included in some or all of the HARQ processes configured for the terminal apparatus 1 and the value of the NDI for the HARQ-ACK information, and may transmit the Type-3 HARQ-ACK codebook by using the PUCCH 808. Here, no value is configured for the NDI corresponding to the SPS PDSCH 809, and thus the terminal apparatus 1 may configure a prescribed value in the field of the value of the NDI corresponding to the SPS PDSCH 809 in the PUCCH 808 and may transmit the PUCCH 808. The prescribed value may be 0, or may be 1. In the PUCCH 808 in FIG. 8, a field 811 may be intended for the HARQ-ACK information corresponding to the one or multiple PDSCHs scheduled by the DL grant and the NDI for the HARQ-ACK information. The field 812 may be intended for the HARQ-ACK information corresponding to the SPS PDSCH and the NIDI for the HARQ-ACK information.

In a case that the higher layer parameter pdsch-HARQ-ACK-OneShotFeedback-r16 is provided to the terminal apparatus 1 and that the SPS PDSCH is configured for the terminal apparatus 1 and that the terminal apparatus 1 has received the SPS PDSCH and the PDSCH to be scheduled by the DL grant and that the HARQ trigger bit included in the DCI format is 1, the bit string mapped to the PUCCH for transmitting the HARQ-ACK information to be triggered and the NDI for the HARQ-ACK information may be arranged in the order of {HARQ-ACK information, NDI}.

The DCI format triggering the Type-3 HARQ-ACK codebook may be used by scheduling the PDSCH. The DCI format triggering the Type-3 HARQ-ACK codebook need not be used for scheduling of the PDSCH.

The DCI format triggering the Type-3 HARQ-ACK codebook may include a field of an indicator indicating whether the format schedules the PDSCH. The DCI format triggering the Type-3 HARQ-ACK codebook may include a field of an indicator indicating whether the DCI format schedules the DL-SCH. The field may be 1 bit, 2 bits, or a prescribed number of bits in size. The field is referred to as a PDSCH indicator. The PDSCH indicator indicating 1 may mean that the DCI format schedules the PDSCH. The PDSCH indicator indicating 0 may mean that the DCI format does not schedule the PDSCH.

In a case that the DCI format schedules the PDSCH, in other words, the PDSCH indicator field included in the DCI format has a value of 1, then the terminal apparatus 1 may transmit the PUCCH including a certain type of HARQ-ACK codebook in a slot corresponding to K1 slots after a slot including the PDSCH scheduled by the DCI format, the value of the K1 being given based on the value of HARQ Timing. For example, in a case that the PDSCH is scheduled in a slot n by the DCI format triggering the Type-3 HARQ-ACK codebook and that the value of the K1 given based on the value of the HARQ Timing is 4, then the terminal apparatus 1 may transmit, in a slot n+4, the PUCCH including the Type-3 HARQ-ACK codebook.

Based at least on the PDSCH indicator field included in the DCI format, the terminal apparatus 1 may determine the difference (offset) between a slot including the last OFDM symbol in which the PDCCH including the DCI format is allocated and a slot in which HARQ-ACK information including a certain type of HARQ-ACK codebook starts to be transmitted.

The certain type of HARQ-ACK codebook may include any of the Type-1 HARQ-ACK codebook, the Type-2 HARQ-ACK codebook, and the Type-3 HARQ-ACK codebook.

In a case that the DCI format does not schedule the PDSCH, in other words, the PDSCH indicator field included in the DCI format has a value of 0, then the terminal apparatus 1 may transmit the PUCCH including a certain type of HARQ-ACK codebook, in a slot after slots equivalent to the value of K1 from a slot in which the PDCCH including the DCI format is received, the value of the K1 being given based on the value of the HARQ Timing. For example, in a case that the PDCCH including the DCI format triggering the Type-3 HARQ-ACK codebook is received in the slot n and that the PDSCH indicator field included in the DCI format is configured with a value of 0 and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the PDSCH indicator field included in the DCI format triggering the Type-3 HARQ-ACK codebook. The base station apparatus 3 may determine the K1 and may include the K1 in the DCI format.

In a case that the DCI format does not schedule the PDSCH, in other words, the PDSCH indicator field included in the DCI format has a value of 0, then the terminal apparatus 1 may transmit the PUCCH including a certain type of HARQ-ACK codebook in a slot after slots corresponding to K1 from a slot indicated by a value in the TDRA field included in the DCI format, the K1 being given based on the value of the HARQ Timing. For example, in a case that the value of the TDRA field included in the DCI format triggering the Type-3 HARQ-ACK codebook indicates the slot n and that the PDSCH indicator field included in the DCI format is configured with a value of 0 and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the PDSCH indicator field included in the DCI format triggering the Type-3 HARQ-ACK codebook. The base station apparatus 3 may determine the K1 and may include the K1 in the DCI format.

In order to indicate whether the DCI format schedule the PDSCH, a certain field may be configured with a prescribed value. In order to indicate whether the DCI format schedules the DL-SCH, a certain field may be configured with a prescribed value. The certain field may be the TDRA field, an FDRA field, or the TDRA and FDRA fields. The prescribed values may be all 0 or may be all 1. The prescribed values may vary depending on a frequency resource allocation method for the PDSCH. In a case that a first method is used for the frequency resource allocation for the PDSCH, the prescribed values may be all 0. In a case that a second method is used for the frequency resource allocation for the PDSCH, the prescribed values may be all 1. In a case that the second method is used for the frequency resource allocation for the PDSCH, the prescribed values may be larger than $N_{BWP}^{SIZE}(L_{RBs}-1)+RB_{start}$. Here, the $N_{BWP}^{SIZE}$ may be the number of resource blocks constituting a BWP. The $L_{RBs}$ may be the number of resource blocks that are continuously allocated. The $RB_{start}$ may be a starting virtual resource block. The $RB_{start}$ may be a starting resource block.

In a case that the DCI format does not include the PDSCH indicator field and that a certain field included in the DCI format has a prescribed value indicating that the PDSCH is not scheduled, then the terminal apparatus 1 may transmit the PUCCH including a certain type of HARQ-ACK codebook in a slot after slots corresponding to K1 from a slot in which the PDCCH including the DCI format is received, the K1 being given based on the value of the HARQ Timing. Here, the certain field may be the TDRA field, the FDRA field, or the TDRA and FDRA fields. The prescribed values may be all 0 or may be all 1. The prescribed values may vary depending on the frequency resource allocation method for the PDSCH. In a case that a first method is used for the frequency resource allocation for the PDSCH, the prescribed values may be all 0. In a case that a second method is used for the frequency resource allocation for the PDSCH, the prescribed values may be all 1. In a case that the second method is used for the frequency resource allocation for the PDSCH, the prescribed values may be larger than $N_{BWP}^{SIZE}(L_{RBs}-1)+RB_{start}$. Here, the $N_{BWP}^{SIZE}$ may be the number of resource blocks constituting a BWP. The $L_{RBs}$ may be the number of resource blocks that are continuously allocated. The $RB_{start}$ may be a starting virtual resource block. The $RB_{start}$ may be a starting resource block. For example, in a case that the PDCCH including the DCI format triggering the Type-3 HARQ-ACK codebook is received in the slot n and that the FDRA field included in the DCI format has a prescribed value indicating the PDSCH is not scheduled and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the fact that the certain field included in the DCI format triggering the Type-3 HARQ-ACK codebook has the prescribed value indicating that the PDSCH is not scheduled. The base station apparatus 3 may determine the K1 and may include the K1 in the DCI format.

In a case that the DCI format does not include the PDSCH indicator field and that a certain field included in the DCI format has a prescribed value indicating that the PDSCH is not scheduled, then the terminal apparatus 1 may transmit the PUCCH including a certain type of HARQ-ACK codebook in a slot after slots corresponding to K1 from the slot indicated by the value in the TDRA field included in the DCI format, the K1 being given based on the value of the HARQ Timing. Here, the certain field may be the TDRA field, the FDRA field, or the TDRA and FDRA fields. The prescribed values may be all 0 or may be all 1. The prescribed values may vary depending on the frequency resource allocation method for the PDSCH. In a case that a first method is used for the frequency resource allocation for the PDSCH, the prescribed values may be all 0. In a case that a second method is used for the frequency resource allocation for the PDSCH, the prescribed values may be all 1. In a case that the second method is used for the frequency resource allocation for the PDSCH, the prescribed values may be larger than $N_{BWP}^{SIZE}(L_{RBs}-1)+RB_{start}$. Here, the $N_{BWP}^{SIZE}$ may be the number of resource blocks constituting a BWP. The $L_{RBs}$ may be the number of resource blocks that are continuously allocated. The $RB_{start}$ may be a starting virtual resource block. The $RB_{start}$ may be a starting resource block. For example, in a case that the slot indicated by the value in the TDRA field included in the DCI format triggering the Type-3 HARQ-ACK codebook is the slot n and that the FDRA field included in the DCI format has a prescribed value indicating that the PDSCH is not scheduled and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the fact that the certain field included in the DCI format triggering the Type-3 HARQ-ACK codebook has the prescribed value indicating that the PDSCH is not scheduled. The base station apparatus 3 may determine the K1 and may include the K1 in the DCI format.

In a case that a certain field included in the DCI format has a prescribed value indicating that the PDSCH is not scheduled, the terminal apparatus 1 may transmit the PUCCH including a certain type of HARQ-ACK codebook in a slot after slots corresponding to K1 from the slot in which the PDCCH including the DCI format is received, the K1 being given based on the value of the HARQ Timing. Here, the certain field may be the TDRA field, the FDRA field, or the TDRA and FDRA fields. The prescribed values may be all 0 or may be all 1. The prescribed values may vary depending on the frequency resource allocation method for the PDSCH. In a case that a first method is used for the frequency resource allocation for the PDSCH, the prescribed values may be all 0. In a case that a second method is used for the frequency resource allocation for the prescribed values may be all 1. In a case that the second method is used for the frequency resource allocation for the PDSCH, the prescribed values may be larger than $N_{BWP}^{SIZE}(L_{RBs}-1)+RB_{start}$. Here, the $N_{BWP}^{SIZE}$ may be the number of resource blocks constituting a BWP. The $L_{RBs}$ may be the number of resource blocks that are continuously allocated. The $RB_{start}$ may be a starting virtual resource block. The $RB_{start}$ may be a starting resource block. For example, in a case that the PDCCH including the DCI format triggering the Type-3 HARQ-ACK codebook is received in the slot n and that the FDRA field included in the DCI format has a prescribed value indicating the PDSCH is not scheduled and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the fact that the certain field included in the DCI format triggering the Type-3 HARQ-ACK codebook has the prescribed value indicating that the PDSCH is not scheduled. The base station apparatus 3 may determine the K1 and may include the K1 in the DCI format.

In a case that a certain field included in the DCI format has a prescribed value indicating that the PDSCH is not scheduled, the terminal apparatus 1 may transmit the PUCCH including a certain type of HARQ-ACK codebook in a slot after slots corresponding to K1 from the slot indicated by the value in the TDRA field included in the DCI format, the K1 being given based on the value of the HARQ Timing. Here, the certain field may be the TDRA field, the FDRA field, or the TDRA and FDRA fields. The prescribed values may be all 0 or may be all 1. The prescribed values may vary depending on the frequency resource allocation method for the PDSCH. In a case that a first method is used for the frequency resource allocation for the PDSCH, the prescribed values may be all 0. In a case that a second method is used for the frequency resource allocation for the PDSCH, the prescribed values may be all 1. In a case that the second method is used for the frequency resource allocation for the PDSCH, the prescribed values may be larger than $N_{BWP}^{SIZE}(L_{RBs}-1)+RB_{start}$. Here, the $N_{BWP}^{SIZE}$ may be the number of resource blocks constituting a BWP. The $L_{RBs}$ may be the number of resource blocks that are continuously allocated. The $RB_{start}$ may be a starting virtual resource block. The $RB_{start}$ may be a starting resource block. For example, in a case that the slot indicated by the value in the TDRA field included in the DCI format triggering the Type-3 HARQ-ACK codebook is the slot n and that the FDRA field included in the DCI format has a prescribed value indicating that the PDSCH is not scheduled and that the value of the K1 given based on the value of the HARQ Timing is 4, then the terminal apparatus 1 may transmit the PUCCH including the Type-3 HARQ-ACK codebook in the slot n+4. The terminal apparatus 1 may determine the K1 based at least on the fact that the certain field included in the DCI format triggering the Type-3 HARQ-ACK codebook has the prescribed value indicating that the PDSCH is not scheduled. The base station apparatus 3 may determine the K1 and may include the K1 in the DCI format.

The fact that the DCI format does not schedule the PDSCH may mean that the DL-SCH is not included in the PDSCH received through a PDSCH reception allocated by resource allocation included in the DCI format. The fact that the certain field included in the DCI format has the prescribed value indicating that the PDSCH is not scheduled may mean that the DL-SCH is not included in the PDSCH received through a PDSCH reception allocated by resource allocation included in the DCI format. The fact that the PDSCH indicator field included in the DCI format has a value of 0 may mean that the DL-SCH is not included in the PDSCH received through a PDSCH reception allocated by resource allocation included in the DCI format. In a case that a certain type of HARQ-ACK codebook is generated, the terminal apparatus 1 need not take into account a PDSCH reception including no DL-SCH. The PDSCH reception may be an occasion for the terminal apparatus 1 to receive the PDSCH in a resource indicated by the resource allocation included in the DCI format. The PDSCH reception may be an occasion for the terminal apparatus 1 to receive the PDSCH in a resource indicated by a part or all of the Frequency domain resource allocation (FDRA) and the Time domain resource allocation (TDRA) included in the DCI format.

A slot after slots corresponding to K1 may mean a slot temporally after K1 slots from a certain slot used as a reference. For example, in a case that the value of K1 is 5 and that the reference slot is n, a slot after slots corresponding to K1 may be n+K1.

The terminal apparatus 1 may ignore the value of the C-DAI included in the DCI format triggering the Type-3 HARQ-ACK codebook. The terminal apparatus 1 may ignore the value of the T-DAI included in the DCI format triggering the Type-3 HARQ-ACK codebook. The terminal apparatus 1 need not consider, for generation of a certain type of HARQ-ACK codebook, the value of the C-DAI included in the DCI format triggering the Type-3 HARQ-ACK codebook. The terminal apparatus 1 need not consider, for generation of a certain type of HARQ-ACK codebook, the value of the T-DAI included in the DCI format triggering the Type-3 HARQ-ACK codebook.

In some or multiple HARQ processes in the scheduled cell, the terminal apparatus 1 need not expect to receive multiple PDSCHs overlapped in the time domain. In some or multiple HARQ processes in the scheduled cell, the terminal apparatus 1 need not expect to receive a PDSCH overlapping with a certain PDSCH in the time domain except PDSCHs including no DL-SCH and scheduled by the DCI format triggering the Type-3 HARQ-ACK codebook. In some or multiple HARQ processes in the scheduled cell, the terminal apparatus 1 need not expect to receive a second PDSCH overlapping with a first PDSCH in the time domain. Here, the first PDSCH need not include a PDSCH including no DL-SCH and scheduled by the DCI format triggering the Type-3 HARQ-ACK codebook. In some or multiple HARQ processes in the scheduled cell, the terminal apparatus 1 may expect that a PDSCH including no DL-SCH overlaps with a certain PDSCH in the time domain. In some or multiple HARQ processes in the scheduled cell, the terminal apparatus 1 may expect that a certain PDSCH overlapping, in the time domain, with a PDSCH including no DL-SCI is scheduled. In some or multiple HARQ processes in the scheduled cell, the terminal apparatus 1 may receive a certain PDSCH overlapping, in the time domain, with a PDSCH including no DL-SCH. In some or multiple HARQ processes in the scheduled cell, the terminal apparatus 1 may receive a PDSCH including no DL-SCH overlapping with a certain PDSCH in the time domain. In some or multiple HARQ processes in the scheduled cell, the terminal apparatus 1 may expect that a PDSCH including no DL-SCH overlapping a the certain PDSCH in the time domain is scheduled. In some or multiple HARQ processes in the scheduled cell, the terminal apparatus 1 may expect that a certain PDSCH overlaps, in the time domain, with a including no DL-SCH.

According to an aspect of the present invention, efficient communication can be implemented. According to an aspect of the present invention, efficient transmission and/or reception of the HARQ-ACK information can be implemented. According to an aspect of the present invention, efficient transmission and/or reception of the HARQ-ACK codebook can be implemented. According to an aspect of the present invention, mismatch in recognition between the terminal apparatus 1 and the base station apparatus 3 during the HARQ process can be resolved, allowing the HARQ process to be operated appropriately.

Various aspects of apparatuses according to an aspect of the present embodiment will be described below.

(1) In order to accomplish the object described above, an aspect of the present invention is contrived to provide the following means. Specifically, a first aspect of the present invention is a terminal apparatus including a processor and a memory storing a computer program code, the terminal apparatus including a receiver configured to receive a PDCCH including DCI triggering a Type-3 HARQ-ACK codebook, and a transmitter configured to transmit a PUCCH including the Type-3 HARQ-ACK codebook triggered, wherein a slot in which the PUCCH is transmitted is provided based on K1 obtained based on a PDSCH-to-HARQ_feedback timing indicator field included in the and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot in which the PDCCH is received.

(2) A second aspect of the present invention is a terminal apparatus including a receiver configured to receive a PDCCH including DCI triggering a Type-3 HARQ-ACK codebook, and a transmitter configured to transmit a PUCCH including the Type-3 HARQ-ACK codebook triggered, wherein a slot in which the PUCCH is transmitted is provided based on K1 obtained based on a PDSCH-to-HARQ feedback timing indicator field included in the DCI, and in a case that the DCI schedules a PDSCH, the PUCCH is transmitted the K1 slots after a slot in which the PDSCH is received, and in a case that the DCI does not schedule a PDSCH, the PUCCH is transmitted in a slot after slots corresponding to the K1 from a slot indicated by a value in a TDRA field included in the DCI.

(3) A third aspect of the present invention is a base station apparatus including a transmitter configured to transmit a PDCCH including DCI triggering a Type-3 HARQ-ACK codebook, and a receiver configured to receive a PUCCH including the Type-3 HARQ-ACK codebook triggered, wherein a slot in which the PUCCH is received is provided based on K1 obtained based on a PDSCH-to-HARQ feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot in which the PDCCH is transmitted.

(4) A fourth aspect of the present invention is a base station apparatus including a transmitter configured to transmit a PDCCH including DCI triggering a Type-3 HARQ-ACK codebook, and a receiver configured to receive a PUCCH including the Type-3 HARQ-ACK codebook triggered, wherein a slot in which the PUCCH is received is provided based on K1 obtained based on a PDSCH-to-HARQ feedback timing indicator field included in the DCI, and in a case that the DCI schedules a PDSCH, the PUCCH is received the K1 slots after a slot in which the PDSCH is transmitted, and in a case that the DCI does not schedule a PDSCH, the PUCCH is received in a slot after slots corresponding to the K1 from a slot indicated by a value in a TDRA field included in the DCI.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the aforementioned embodiment may be partially implemented by a computer. In such a case, a program for implementing such control functions may be recorded on a computer-readable recording medium to cause a computer system to read and execute the program recorded on this recording medium.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

The terminal apparatus 1 may include at least one processor, and at least one memory including a computer program instruction (computer program). The memory and the computer program instruction (computer program) may adopt a configuration of causing the terminal apparatus 1 to perform the operation and the processing described in the above embodiment by using a processor. The base station apparatus 3 may include at least one processor, and at least one memory including a computer program instruction (computer program). The memory and the computer program instruction (computer program) may adopt a configuration of causing the base station apparatus 3 to perform the operation and the processing described in the above embodiment by using a processor.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a NextGen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. A circuit integration technique is not limited to the LSI, and may be implemented with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. Furthermore, for an aspect of the present invention, various modifications are possible within the scope of the claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:

1. A terminal apparatus comprising:
a receiver configured to receive a Physical Downlink Control Channel (PDCCH) including Downlink Control Information (DCI), the DCI comprising a dedicated field that triggers a Type-3 Hybrid Automatic Repeat reQuest (HARQ)-ACKnowledgement (HARQ-ACK) codebook; and
a transmitter configured to transmit a Physical Uplink Control Channel (PUCCH) including the Type-3 HARQ-ACK codebook that is triggered, wherein:
a slot in which the PUCCH is transmitted is provided based on an obtained K1, wherein the K1 is a positive integer that is obtained based on a Physical Downlink Shared Channel (PDSCH)-to-HARQ feedback timing indicator field included in the DCI,
in a case that the DCI schedules a PDSCH, the PUCCH is transmitted in a slot after K1 slots from a slot in which the PDSCH is received, and
in a case that the DCI does not schedule the PDSCH, the PUCCH is transmitted in a slot after K1 slots from a slot in which the PDCCH is received.

2. The terminal apparatus according to claim 1, wherein the Type-3 HARQ-ACK codebook includes HARQ-ACK information of all of HARQ processes.

3. The terminal apparatus according to claim 1, wherein a number of slots from the slot in which the PDCCH is received to the slot in which the PDSCH is received is indicated by the DCI.

4. A base station apparatus comprising:
a transmitter configured to transmit a Physical Downlink Control Channel (PDCCH) including Downlink Control Information (DCI), the DCI comprising a dedicated field that triggers a Type-3 Hybrid Automatic Repeat reQuest (HARQ) ACKnowledgement (HARQ-ACK) codebook; and
a receiver configured to receive a Physical Uplink Control Channel (PUCCH) including the Type-3 HARQ-ACK codebook that is triggered, wherein:
a slot in which the PUCCH is received is provided based on an obtained K1, wherein the K1 is a positive integer that is obtained based on a Physical Downlink Shared Channel (PDSCH)-to-HARQ feedback timing indicator field included in the DCI,
in a case that the DCI schedules a PDSCH, the PUCCH is received in a slot after K1 slots from a slot in which the PDSCH is transmitted, and
in a case that the DCI does not schedule the PDSCH, the PUCCH is received in a slot after K1 slots from a slot in which the PDCCH is transmitted.

5. The base station apparatus according to claim 4, wherein
the Type-3 HARQ-ACK codebook includes HARQ-ACK information of all of HARQ processes.

6. The base station apparatus according to claim 4, wherein
a number of slots from the slot in which the PDCCH is transmitted to the slot in which the PDSCH is transmitted is indicated by the DCI.

7. A communication method used for a terminal apparatus, the communication method comprising:
receiving a Physical Downlink Control Channel (PDCCH) including Downlink Control Information (DCI), the DCI comprising a dedicated field that triggers Type-3 Hybrid Automatic Repeat reQuest (HARQ) ACKnowledgement (HARQ-ACK) codebook; and
transmitting a Physical Uplink Control Channel (PUCCH) including the Type-3 HARQ-ACK codebook that is triggered, wherein:
a slot in which the PUCCH is transmitted is provided based on an obtained K1, wherein the K1 is positive integer that is obtained based on a Physical Downlink Shared Channel (PDSCH)-to-HARQ_feedback timing indicator field included in the DCI,
in a case that the DCI schedules a PDSCH, the PUCCH is transmitted in a slot after K1 slots from a slot in which the PDSCH is received, and
in a case that the DCI does not schedule the PDSCH, the PUCCH is transmitted in a slot after K1 slots from a slot in which the PDCCH is received.

8. The communication method according to claim 7, wherein
the Type-3 HARQ-ACK codebook includes HARQ-ACK information of all of HARQ processes.

9. The communication method according to claim 7, wherein
a number of slots from the slot in which the PDCCH is received to the slot in which the PDSCH is received is indicated by the DCI.

* * * * *